June 20, 1944.　　　A. H. REIBER　　　2,351,784
PRINTING TELEGRAPH APPARATUS
Original Filed May 4, 1936　　10 Sheets-Sheet 1

INVENTOR
ALBERT H. REIBER
BY
*H.B. Whitfield*
ATTORNEY

June 20, 1944.  A. H. REIBER  2,351,784
PRINTING TELEGRAPH APPARATUS
Original Filed May 4, 1936   10 Sheets-Sheet 3

INVENTOR
ALBERT H. REIBER
BY
ATTORNEY

June 20, 1944.  A. H. REIBER  2,351,784
PRINTING TELEGRAPH APPARATUS
Original Filed May 4, 1936    10 Sheets-Sheet 4

INVENTOR
ALBERT H. REIBER
BY
*J. B. Whitfield*
ATTORNEY

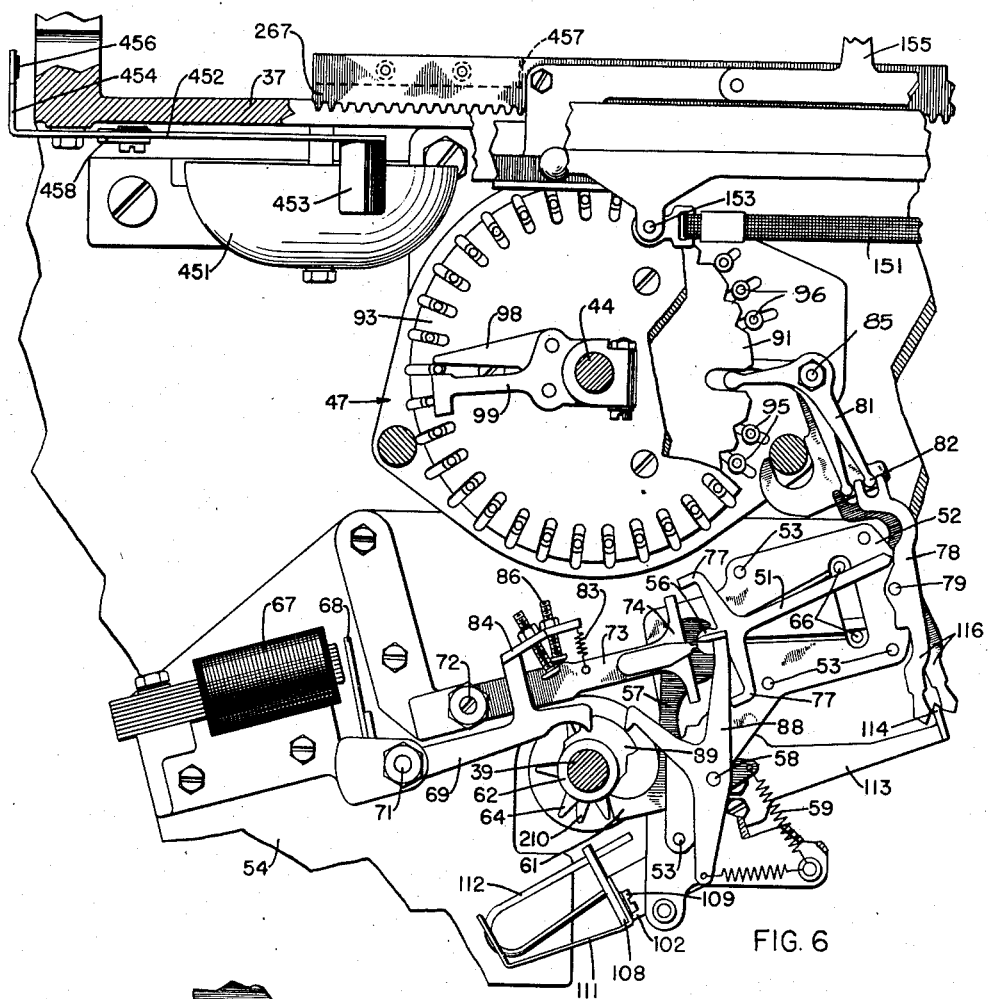

June 20, 1944.  A. H. REIBER  2,351,784
PRINTING TELEGRAPH APPARATUS
Original Filed May 4, 1936  10 Sheets-Sheet 7

INVENTOR
ALBERT H. REIBER
BY
ATTORNEY

June 20, 1944.  A. H. REIBER  2,351,784
PRINTING TELEGRAPH APPARATUS
Original Filed May 4, 1936  10 Sheets-Sheet 8

INVENTOR
ALBERT H. REIBER
BY
ATTORNEY

June 20, 1944.  A. H. REIBER  2,351,784
PRINTING TELEGRAPH APPARATUS
Original Filed May 4, 1936   10 Sheets-Sheet 9

INVENTOR
ALBERT H. REIBER
BY
ATTORNEY

June 20, 1944. A. H. REIBER 2,351,784
PRINTING TELEGRAPH APPARATUS
Original Filed May 4, 1936 10 Sheets-Sheet 10
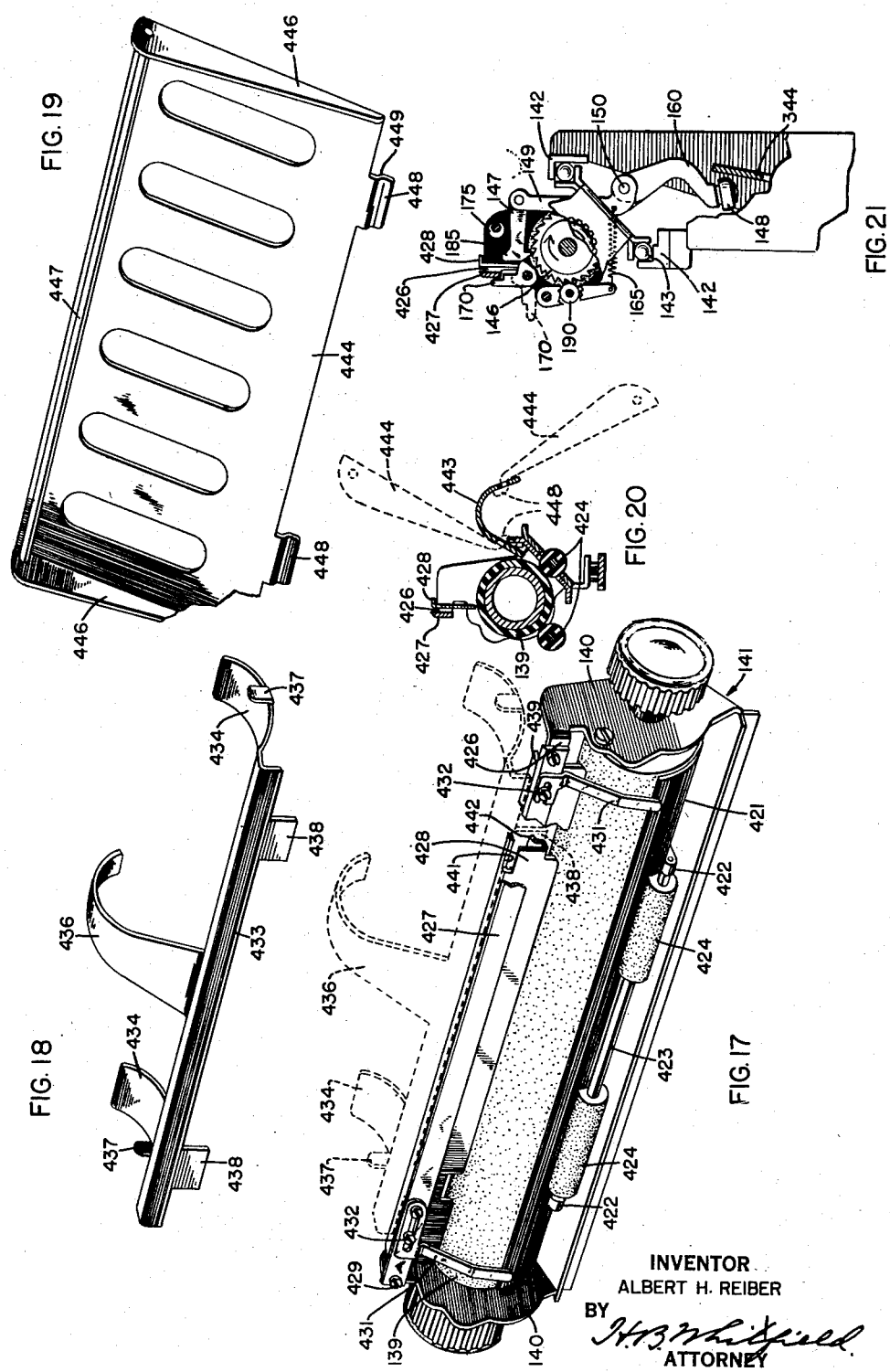
INVENTOR
ALBERT H. REIBER
BY
H.B.Whitfield
ATTORNEY Patented June 20, 1944

2,351,784

UNITED STATES PATENT OFFICE 2,351,784

PRINTING TELEGRAPH APPARATUS

Albert H. Reiber, Evanston, Ill., assignor to Teletype Corporation, Chicago, Ill., a corporation of Delaware Original application May 4, 1936, Serial No. 77,796. Divided and this application June 14, 1941, Serial No. 398,074

6 Claims. (Cl. 197—89)

This invention relates to printing apparatus and particularly to a type wheel printer for recording printed characters in page form.

This application is a division of copending application Serial No. 77,796, filed May 4, 1936, by Albert H. Reiber which matured on September 29, 1942, into Patent No. 2,296,874.

The principal object of the invention is to endow a type wheel printer with many of the advantageous features of a type bar printer while retaining the simplicity of construction characteristic of type wheel printers.

A further object is to provide a type wheel printer having the principal operating characteristics of certain commercially used type bar printers so as to be capable of being operated over the same telegraph circuits and in interconnection with the commercially used type bar printers to record the same message in line for line arrangement and perform the same functions as the type bar printer.

The invention also features function mechanism in which the performance of any function may be blocked by an element or elements associated with the case shift mechanism of the printer. Thus, two functions, or a character selection and a function may be associated with one code combination. Under these circumstances, selection between the two functions, or between the character and the function, is determined by selective case shift conditioning preceding the function selection.

Briefly, the principal elements of the receiving apparatus are a selecting mechanism including a single magnet selector and a code disc selector, power driven operating cams controlled from the selecting mechanism, a type wheel and means for stopping it in accordance with the operation of the code disc selector, cam operated means for effecting printing from the type wheel, cam controlled and operated mechanisms for performing the necessary stunts or functions of the printer, mechanism for feeding an inked ribbon between the type wheel and a printing platen including means for controlling the direction of feeding of the ribbon, and a movable carriage which carries the paper upon which printing is to be effected.

The single magnet selector operates in accordance with signal impulses received sequentially to position settable elements correspondingly. Power operated transfer mechanism then operates through the elements thus set to transfer simultaneously all of the conditions established by the received signal impulses to a code disc selector which has a plurality of stop elements, any one of which, upon selection, is projected into the path of an arm on a type wheel shaft, to which a constant torque is applied, to stop the type wheel in a position corresponding to the received signal combination. The single magnet selector mechanism controls the operation of a set of operating cams, one of which operates the transfer mechanism to effect the setting of the code discs, another of which operates a printing bail and in addition, under certain selective conditions, performs certain non-printing functions and conditions other non-printing functions for performance, and the third and final cam of which operates the spacing mechanism and performs those functions that are conditioned but not performed by the printing bail. Spacing from one character to another and between words is accomplished through a pawl and ratchet, the latter of which is connected to a pinion meshing with a rack included in the platen carriage. The spacing operation tends to be performed with invariable regularity but is, under certain circumstances, suppressed, as for example, during the performance of functions which, if accompanied by spacing, might result in the introduction of undesirable spaces in the printing of letter combinations. Those functions which are performed by operation of the spacing cam are the functions which it is desirable to perform slowly, in order to obviate attempted violent movement of relatively massive elements. Those functions that are performed by the print bail operating cam are functions involving the movement of relatively light elements, the inertia of which is comparatively low so that they may be operated with relatively great rapidity, as the printing bail operating cam is arranged to perform an operation in a very brief interval. In the case of certain functions, a yielding connection is provided between a function conditioning lever and an associated lever, and the latter lever may be blocked by any desired means and in particular by the case shift mechanism of the printer, so that the function conditioning operation may be dissipated in the yieldable connection and the performance of a function may be made dependent not only upon a particular code combination associated with that function, but also upon the predetermined condition of the case shift mechanism as determined by a previously received different code combination.

The particular type wheel mechanism disclosed herein is fully described and claimed in a copending application of Howard L. Krum et al., Serial No. 77,794, filed on May 4, 1936, which matured on November 21, 1939, into Patent No. 2,180,360.

For a more complete understanding of the invention, reference may be had to the following detailed description, taken in conjunction with the accompanying drawings in which Fig. 1 is a perspective view of the combined transmitting and receiving apparatus in accordance with the invention;

Fig. 6 is a detailed plan view of the selecting mechanism and portions of the carriage mechanism;

Figs. 7 and 8 are respectively, elevational and plan views of the case shift mechanism;

Fig. 17 is a perspective view of the platen carriage showing particularly paper holding and guiding means;

Fig. 18 is a perspective view of a removable paper roll holder shown in broken lines in Fig. 17;

Fig. 19 is a perspective view of a paper guiding plate;

Fig. 20 is a vertical sectional view through the platen carriage showing the manner of mounting the plate shown in Fig. 19 upon the carriage;

Fig. 21 is a vertical sectional view showing the line feeding mechanism;

Fig. 23 is a schematic wiring diagram.

Keyboard transmitter

Figure 1:
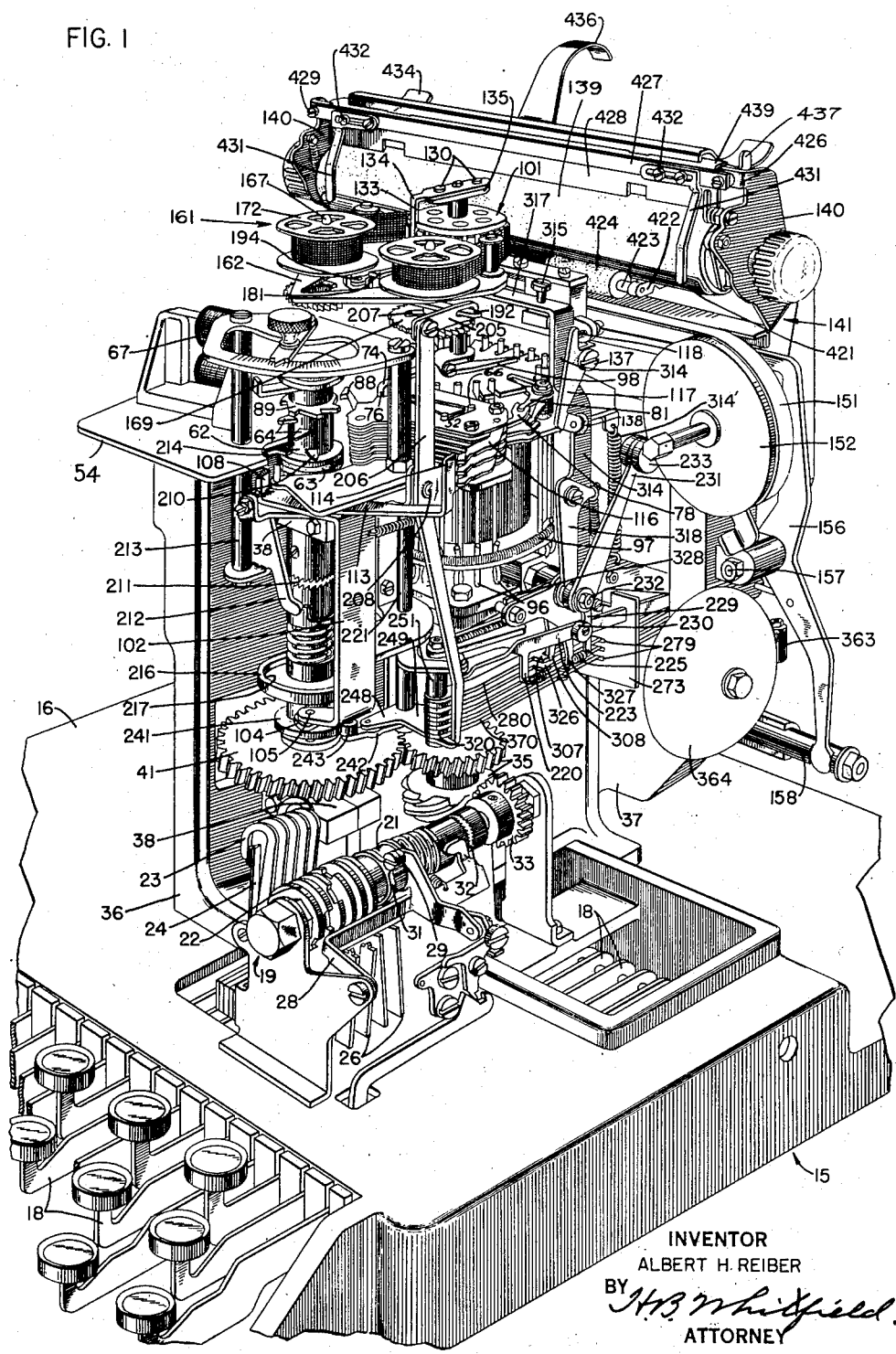
Figure 2:
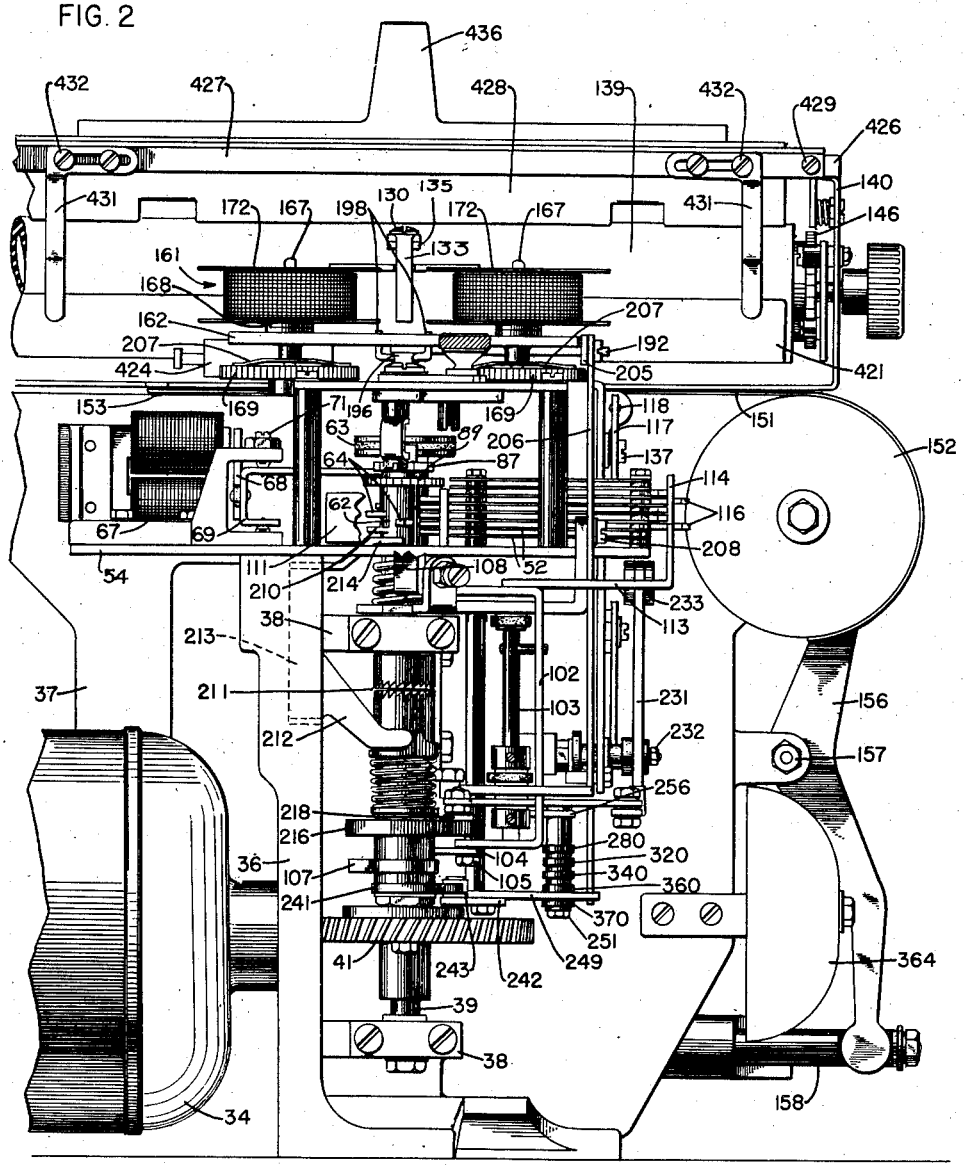
Fig. 2 is a front elevational view of the receiving and printing mechanism.
Figure 5:
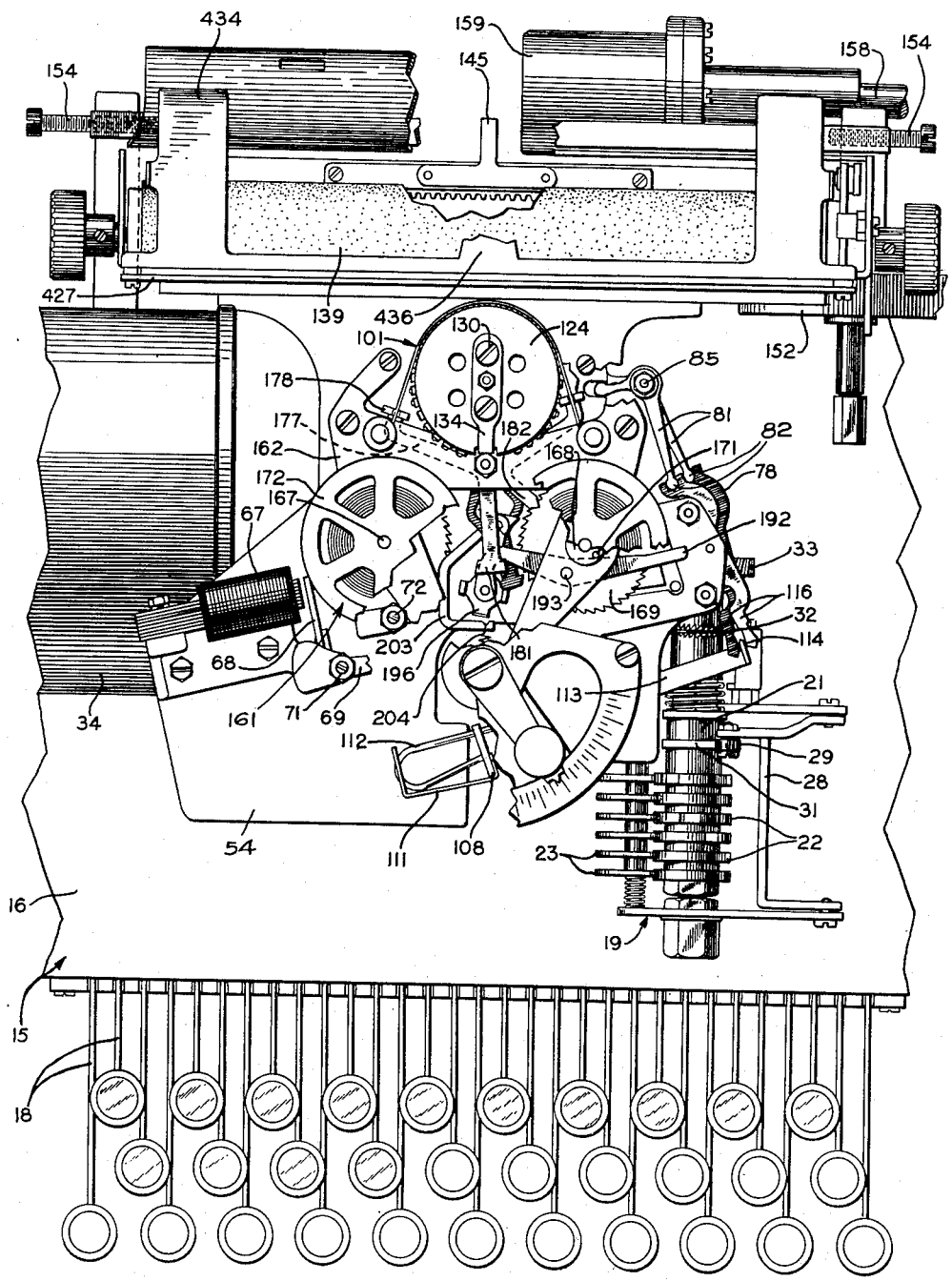
Fig. 5 is a top plan view of the transmitting and receiving mechanism.

Referring now to the drawings and particularly to Figs. 1 and 5, the reference numeral 15 indicates generally a keyboard transmitter mechanism which may be of any desired form such as the one disclosed in U. S. Patent 1,595,472, granted August 10, 1926 to Howard L. Krum. The keyboard transmitter 15 includes a base casting 16 which carries a plurality of character selecting key levers 18. The key levers operate upon a set of permutation bars (not shown) to control transmitting apparatus indicated generally by the reference numeral 19. The transmitting apparatus includes a cam shaft 21 which carries a plurality of transmitting cams 22. A contact controlling bell crank lever 23 is associated with each of the transmitting cams 22. One end of each of the bell crank levers 23 is disposed in engagement with one spring of a pair of transmitting contact springs 24 (Fig. 1) and the other end is aligned with a lever 26 which is controlled by the permutation bars (not shown). In their idle positions, the transmitting cams 22 maintain the bell crank levers 23 in a position such that all but one of the pairs of transmitting contacts are open, the excepted contact pair being closed for the application of a stop pulse to the line. Upon the operation of a key lever 18, the permutation bars and therefore the levers 26 which they control are set permutatively, whereby certain of the bell crank levers 23 are blocked so that they cannot rotate and others are freed so that they may rotate to allow closing of the associated transmitting contacts 24 when permitted to do so by their associated transmitting cams 22. The transmitting cams are so arranged upon the shaft 21 that they release the several transmitting contact bell crank levers 23 successively for rotation and thus the transmitting contacts corresponding to the particular permutation code established by the operated key lever are closed successively. A locking bail 28 has a cam follower 29 which rides on a cam 31 carried by cam shaft 21. Bail 28 drops into blocking relation to the levers 26 after they are set by the permutation bars and prevents disturbance of an established code combination during the transmission of the corresponding code impulses. Power for driving the transmitting cam shaft 21 is communicated through a spring loaded clutch 32 from a gear 33 which is driven through suitable intermediate gearing 35 from a gear 41 (Figs. 1 and 2).

The base casting 16 removably supports the foundation for a receiving printer comprising a vertically extending frame casting 36 and a frame casting 37 secured to the casting 36. The frame casting 36 extends from front to rear of the base casting 16 and the casting 37 extends transversely thereof. The frame casting 36 has secured thereto bearing blocks 38 which rotatably support a shaft 39. Shaft 39 has secured thereto a gear 41 (Figs. 1 and 2) which is driven by a spiral gear 42 (Fig. 4) which is mounted on the rotor shaft of motor 34 and constitutes the main driving gear of the receiving printer as well as of the transmitting mechanism. The shaft 39 actuates the selector mechanism of the receiving printer and also the operation performing cams.

The driving gear 42 (Fig. 4) also meshes with a gear 43 which is mounted on a shaft 44 and is operatively connected thereto through a friction clutch 46. Shaft 44 is journalled in a code disc selector mechanism indicated generally by the reference numeral 47 (Fig. 3) which is removably supported on the frame member 36.

Selecting mechanism

Figure 4:
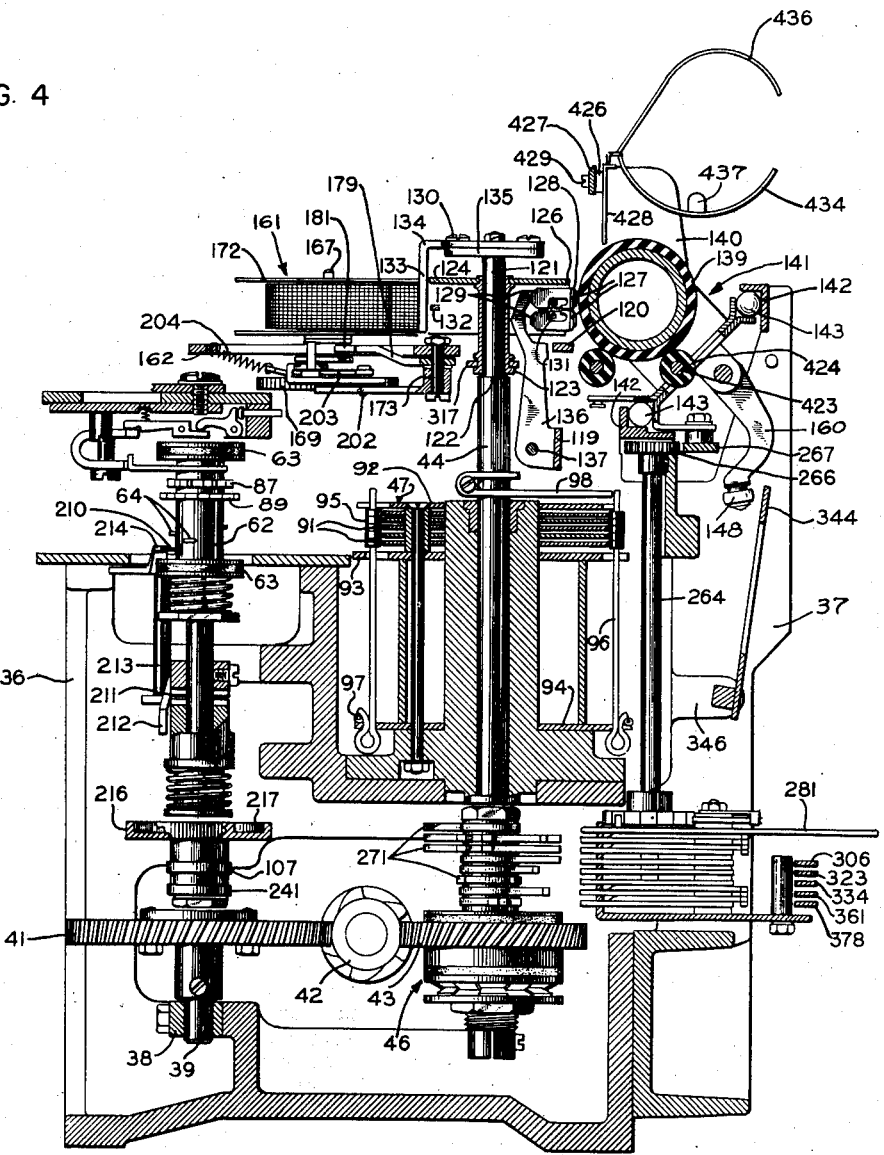
Fig. 4 is a vertical sectional view through the receiving and printing mechanism.

At the top of frame member 36 there is mounted a single magnet selector mechanism which is generally similar to the selector disclosed in U. S. Patent 1,937,376, granted November 28, 1933 to Walter J. Zenner. The selector mechanism (Fig. 6) comprises a set of selector elements in the form of thin, flat fingers 51 arranged in superposed relation between guide plates 52. The selector fingers 51 equal in number the signalling elements in the code on which the receiving printer operates. Thus, if a five-unit code is employed, there will be five of the selector fingers 51, whereas a six-unit code will require six selector fingers. The guide plates 52 are mounted on studs 53 secured to the selector mounting plate 54 and are spaced by washers (not shown). The circular left ends 56 of selector fingers 51 engage corresponding sockets of thin, flat bell crank levers 57 pivoted on a common shaft 58. Individual springs 59 bias the bell cranks 57 in their clockwise direction whereby the selector fingers 51 are urged rightwardly. The pointed ends 61 of bell crank levers 57 are thus maintained in contact with a cam barrel 62 which is mounted on shaft 39 and is driven thereby through friction discs, indicated at 63 (Fig. 4).

Cam barrel 62 is provided with a helically arranged series of cam projections 64 (Fig. 6), one for each of the bell cranks 57, which rotate the bell cranks 57 in succession and thus draw the selector fingers 51 leftwardly successively as the cam barrel 62 is rotated. In addition to the longitudinal movement, the selector fingers have a laterally swinging movement between a pair of studs 66.

The setting of any selector finger 51 either to its clockwise or counterclockwise position is determined by the electromagnet 67 which is mounted on the mounting plate 54 and which is provided with armature 68 fixed to a flutter lever 69 which is pivoted at 71 to a frame carried by the supporting plate 54. Mounted on a pivot 72 adjacent to and in cooperative relation with the flutter lever 69 is a selector lever 73. Lever 73 terminates in a T-shaped portion 74 having downwardly extending arms 76 (Fig. 1) which constitute abutments which cooperate with arms 77 (Fig. 6) on the left ends of the selector fingers 51 and act to position the latter in extreme clockwise or extreme counterclockwise positions. The several fingers 51 act through a corresponding number of levers 78 arranged between the guide plates 52 and pivotally mounted on a stud 79 to position a set of transfer bell crank levers 81, pivoted at 85, which have disc portions 82 engaging sockets in levers 78.

As previously stated, each selector finger 51 is shifted clockwise or counterclockwise by having one or the other of its arms 77 drawn against one or the other of the abutments 76 of the T-shaped portion 74 of selector lever 73. The selector lever 73 is connected by a spring 83 to an arm 84 of the flutter lever 69 and the minimum distance between the levers 69 and 73 is determined by an abutment screw 86. The flutter lever 69 has a portion which follows a flutter cam 87 (Figs. 2 and 4) included in the cam barrel assembly 62.

As the signal impulses are received over the telegraph line, the electromagnet 67 is energized and deenergized depending upon the nature of such impulses. During the reception of a set of impulses constituting a signal, the cam barrel 62 is rotated, flutter lever 69 follows flutter cam 87, and armature 68 is moved cyclically into engagement with its pole face. If the armature 68 is then held due to the presence of an energizing impulse through the winding of its electromagnet connected in the line, the flutter lever 69 will be prevented from following the contour of the flutter cam 87. The abutment screw 86 and spring 83 cause the selector lever 73 to follow the motions of the flutter lever 69 so that when the levers are moved counterclockwise, one of the abutments 76 of selector lever 73 is moved into alignment with one set of arms 77 of the selector fingers 51 and when the levers are rotated to their extreme clockwise positions, the other abutment 76 is moved into alignment with the other set of arms 77. The several cams 64 on the cam barrel 62 are so positioned with respect to the flutter cam 87 that the selector fingers 51 are drawn leftwardly in synchronism with the signalling impulses received by the selector magnet 67 so that a selector finger 51 will be moved from a position corresponding to a spacing signal to a position corresponding to a marking signal only if the armature 68, after being rotated into engagement with its pole face by flutter cam 87, is held by the electromagnet as the selector finger 51 is drawn leftwardly by its associated bell crank lever 57 and will not be so shifted as a result of mere movement of the armature 68 as the flutter lever 69 follows a high portion of flutter cam 87. A cam operated lock lever 88 locks and releases selector lever 73 at proper intervals under control of a cam 89 on the cam barrel 62.

The transfer bell crank levers 81 are connected by socket connections to the code discs of a code disc selector mechanism which, as previously mentioned, is designated generally by the reference numeral 47. The selector mechanism 47 includes code discs 91 equal in number to the number of selector fingers 51, and each of the discs is supported so as to be rotatably responsive to the transfer bell crank lever 81 to which it is articulated. The discs 91 have their edges notched permutatively so that for each permutative setting of the discs a single complete alignment of notches of the several discs will be effected.

The code disc selector mechanism 47 has plates 92 and 93 (Fig. 4) disposed respectively above and below the code discs 91 and a plate 94 disposed below and at some distance from the plate 93. The three plates 92, 93, and 94 have radially arranged slots equi-distantly spaced, the slots corresponding in number and positions to the permutative alignment of the notches in the code discs 91. A selectable stop pin 96 is disposed in each vertical alignment of slots in the discs 92, 93, and 94 and each pin has a portion extending below the disc 94, which portion is eyelet-shaped, and a straight portion extending above the disc 92. A garter spring 97 surrounds all of the stop pins 96 and retains them properly seated in the disc 94.

Each of the pins 96 carries anti-friction rolls 95 (Figs. 4 and 6) equal in number to and in alignment with the code discs 91. With any permutative disposition of the code discs 91 an alignment of notches will be presented opposite the anti-friction rolls carried by one of the stop pins 96. The stop pin opposite which the notches are aligned pivots about the inner limit of the slot in the plate 94 so that its upper end moves toward the type wheel shaft 44 in a direction radially of said shaft as the anti-friction rolls 95 become seated in the alignment of notches in the code discs. Only one of the stop pins 96 can be selected at a particular time due to the fact that there cannot be two alignments of code disc notches simultaneously.

The type wheel shaft 44 carries in fixed relation thereto a stop arm 98, the outer end of which clears unselected stop pins 96 but is blocked by a selected stop pin and is prevented from further rotation until the selected pin has been cammed outwardly by one or more of the code discs due to a change in their permutative arrangement. A leaf spring 99 (Fig. 6) carried by the stop arm 98 precedes the stop arm 98 as the shaft 44 rotates and the end of the lead spring 99 passes over the top of any stop pin 96 that is selected and drops ahead of the pin when the arm 98 is stopped, thereby confining the pin between the arm 98 and the leaf spring 99 and preventing the stop arm from bouncing away from the stop pin 96 by which it has been arrested. The shaft 44 carries a type wheel which is designated generally by the reference numeral 101. The selective operation of the stop pins 96 determines stop positions of the type wheel.

Transfer mechanism

The shifting of the code discs 91 to establish successive selections of the stop pins 96 is effected through the medium of a power actuated transfer bail 102 (Figs. 1, 2, 3, 6, and 11). The bail 102 is pivoted on a shaft 103 and has a lever 104 adjustably connected thereto by screw 105. The lever 104 carries a cam follower roller 106 which rides against a cam 107. The bail 102 has at its upper end a vertically extending arm 108 to which is secured by bolts 109 a U-shaped extension 111 (Fig. 6). The arm 108 and the opposite side portion of the extension 111 are provided with rectangular apertures which receive U-shaped springs 112. One arm of each of the springs 112 extends through the aperture in the arm 108 of transfer bail 102 and terminates in alignment with one of the bell crank levers 57. The other arm of each of the springs 112 terminates in the aperture in the arm 108 and is confined there by that arm of the U-shaped extension 111 which is secured by the screw 109 and which partially covers the aperture in arm 108. The springs 112 are under tension in the aperture in the vertical arm 108.

The springs 112 serve as individual yielding operating connections between the transfer bail 102 and the several bell crank levers 57. When the transfer bail 102 is rocked in a clockwise direction by cam 107, the ends of the springs 112 engage the bell crank levers 57 and rock them clockwise and the bell crank levers in turn shift the selector fingers 51 rightwardly. The selector fingers 51 rock the levers 78 clockwise or counterclockwise, depending upon the positions into which the fingers 51 have been moved through the action of the selector magnet 67, selector lever 73, and bell crank 57. As previously described, shifting of the levers 78 causes corresponding shifting of the transfer bell crank levers 81 which are articulated to the code discs 91 so that permutative arrangements of the code discs in accordance with signals received by the selector magnet 67 are set up when the transfer bail 102 is actuated in a clockwise direction. Springs 59 bias the bell crank levers 57 in clockwise direction, as previously described, and while the springs may be of sufficient tension to shift selector fingers 51, the levers 78, transfer levers 81, and code discs 91, it has been found desirable not to rely on the springs to effect the transfer of selections to the code discs, and to this end a locking bar has been provided to prevent the springs from effecting such transfer at all times except when the transfer bail is to be operated.

The transfer bail is provided with an extension arm 113 which terminates in a knife-edge 114. The levers 78 are provided with extensions 116 which terminate beyond the position occupied by the knife-edge 114 when the transfer bail 102 is in its extreme counterclockwise position. The knife-edge 114 thus serves when in locking position to restrain the levers 78 from being moved by the springs 59. Since the extension arm 113 is carried by the transfer bail 102, it is withdrawn to a position which clears the ends 116 of the levers 78 when the transfer bail is rocked in a clockwise direction and at this time the code discs are shifted by the combined action of the transfer bail 102 operating through springs 112 and the springs 59. Arm 113 returns to locking position when the transfer bail 102 is restored to its normal or unoperated position.

Type wheel

The type wheel shaft 44 has a reduced portion 121 at the upper end thereof which provides a shoulder 122 (Fig. 4). A hub 123 is journalled on the reduced portion 121 of shaft 44 and is slidable thereon. At its upper end the hub 123 carries a disc 124 to which is secured an annular type wheel frame 126. The frame 126 has slots in radial arrangement equally spaced therearound, and in each of the slots upper and lower type pallets 127 are slidably disposed. The type pallets 127 are arranged in upper and lower annular rows, one row of which may carry any desired group of characters such as letters and the other of which may carry other characters such as figures and punctuation marks. The type pallets comprise type faces 128 to which are secured thin shanks 129 which extend inwardly and radially of the type wheel structure within the radial slots thereof. The shanks of each annular row of type pallets are notched to receive a garter spring 131 which biases all of the type pallets of an annular row to their innermost positions with the type faces 128 disposed about the periphery of the slotted frame 126. An annular ring 132 is floatingly disposed in the notches in both annular rows of type pallets and prevents the type pallets from accidental displacement from the type wheel structure due to centrifugal force in the event that one of the garter springs 131 should break. At one portion of its periphery, the type wheel structure has no type pallets and at that point the disc 124 and frame 126 are provided with recesses in which is disposed a perpendicular portion 133 of a type wheel driving arm 134 which is adjustably secured by screws 130 to an arm 135 which is carried by the type wheel shaft 44 at the top thereof in fixed relation to the shaft to be driven thereby. The adjustability between the arms 134 and 135 is angular.

The type wheel structure is slidable longitudinally of the type wheel shaft to bring either of the two rows of type pallets into printing alignment with the printing platen, the shifting of the structure being accomplished by a sliding movement of the hub 123 with respect to the type wheel shaft 44 produced by mechanism to be described hereinafter. As the type wheel is shifted, the recesses in which the perpendicular portion 133 of driving arm 134 is disposed slide upon the portion 133 and driving relation between the type wheel shaft and the type wheel is maintained. A printing hammer 136 is pivotally mounted on screws 137 threaded into the stationary bracket 125 (Fig. 3) and has its head in alignment with the printing position so that it is disposed behind the shank of the type pallet of either of the annular rows of type pallets, depending upon whether the type wheel is in its upper or lower position. The printing hammer 136 has integral therewith a bail portion 119 at the opposite end of which is integrally formed a lever arm 117 (Figs. 1 and 3) which carries an impact receiving member 138. A limit screw 118 limits the operative movement of lever arm 117. The lever arm 117 is actuated by a striker member to be described later. The operative movement of the print hammer 136 is a sudden clockwise rotation as viewed in Fig. 4, whereby the type pallet which is aligned with the print hammer at the moment is driven outwardly and radially of the type wheel structure into engagement with the printing platen 139. A stop bar 128 mounted on top of the bracket 125 projects into the path of the hammer 136 and limits the movement thereof.

*Carriage mechanism*

The printing platen 139 is rotatably mounted in end plates 140 of a reciprocating carriage 141 (Fig. 1). The carriage 141 is supported in adjustable rails 142 at the top of the main frame member 37. Anti-friction balls 143 (Fig. 4) are disposed between the carriage 141 and the rails 142 and provide free movement of the carriage with respect to its supporting rails. The rotatable platen is provided with a feed ratchet 146 (Fig. 2) with which there cooperates a feed pawl 147 (Fig. 21).

The platen feeding pawl is articulated to a lever 149 (Fig. 21) that is fixed to a rock shaft 150. The rock shaft 150 is rotatably journalled in the carriage 141 and has fixed thereto at a point substantially midway between the ends of the carriage 141 an operating lever 160. The lever 149, rock shaft 150, and operating lever 160 are biased counterclockwise by a spring 165. Feeding of the ratchet 146 in the direction indicated by the arrow is effected by clockwise rotation of operating lever 160, by a power actuated bail to be described later, against the tension of spring 165, which subsequently acts to reciprocate the pawl 147 to pick up the next tooth or teeth for the next line feeding operation. A lever 170, pivoted on the carriage end plate 140, provides two abutments for deflecting the pawl at different points in its travel to idle or unoperated position to establish single or double line spacing. When the lever is in the position shown in dotted line, it permits the pawl to travel sufficiently far in engagement with the ratchet 146 to pick up two teeth, whereas if the lever is in the full line position the pawl is deflected from the ratchet and is permitted, when it operates, to pick up only one tooth. An adjustable eccentric 175 is mounted on the carriage end plate 140 and is disposed in the path of a camming lug 185 on the pawl 147 for wedging the pawl against the ratchet to prevent over-travel of the ratchet and platen. A spring biased jockey roll 190 bears against the ratchet 146 and controls the positioning of the platen 139.

The carriage 141 is moved to its right-hand position by a belt 151 (Fig. 2), which has one end connected to a drum 152 which contains a spiral spring by which the drum is urged to rotate in a clockwise direction and which has its other end connected to a pin 153 (Figs. 3 and 6) carried by the carriage 141. The carriage 141 is moved leftwardly by spacing mechanism to be described hereinafter against the action of the spiral spring. A lever 156 pivoted at 157 (Fig. 3) has one end articulated to the plunger rod 158 of a dashpot 159 and has its other end positioned to be engaged by the carriage 141 as it travels into its extreme right-hand position by the action of the spiral spring. With this arrangement, the return of the carriage to its extreme right-hand position is cushioned by the dashpot 158. Stop screws 154 threadedly engage the carriage supporting portion 147 of the frame casting 37 at opposite ends of said portion, and the inner ends of the stop screws are disposed in the path of a bracket 145 mounted on the carriage 141. The screws 154 limit the movement of the carriage in both directions of travel.

*Ribbon mechanism*

At the top of the printer and adjacent to the type wheel assembly 101 there is provided a ribbon feed mechanism designated generally by the reference numeral 161 (Figs. 1, 2, 3, 4, 5, 13, 14, 15, and 16) for supporting an inked ribbon similar to the ribbons employed in typewriting machines and for feeding the ribbon past the printing position and between the type pallets and the printing platen. The reference numeral 162 designates a plate which is the foundation of the entire ribbon feed mechanism and which is in turn supported on the printer by means of posts 163 so that the complete ribbon feed mechanism is removable as a unit.

The plate 162 carries arcuate ribbon guide band 164 which guides the ribbon around the type wheel assembly 101 and which is provided with an aperture 166 through which the type pallets may strike against the paper, upon which characters are to be recorded, with the ink ribbon interposed between the type pallets and the paper whereby a character is imprinted upon the paper. Ribbon spool supporting pins 167 are journalled in the side arms of the plate 162 and each pin has secured thereto above the plate 162 a disc 168 and at the lower end of the pin below the plate 162 a ratchet wheel 169 which may be rotated by means of a pawl to cause the positive rotation of the pin 167 and disc 168. Each of the discs 168 carries a pin 171 which engages a ribbon spool 172 to cause the spool to be driven when the ratchet 168 is positively rotated by its operating pawl.

The plate 162 carries a pivot pin 173 on which, below the plate 162, are pivoted two levers, one of which is designated generally by the reference numeral 174, the other of which is designated generally by the numeral 176. The lever 174 has oppositely extended symmetrical arms 177 at the outer ends of which are portions 178 formed perpendicular to the arms 177 and bifurcated. The path of the ink ribbon, as it passes from one spool to another, is through the bifurcations in the perpendicular portions 178 of the arms 177. The lever 174 also has an arm 179 extending away from the arms 177 on the line of a bisector of the angle between the arms 177. This arm 179 is widened at its outer end as shown at 181 and an additional arm 182 which is pointed at its outer end cooperates with a spring 180 to serve as a jockey to maintain the lever 174 in either of the two positions to which it may be shifted. Lever 176 has the general contour of a bell crank lever, one arm 184 of which has at its outer end shoulders 186 disposed in the plane of the ratchet wheels 169 to serve as a retaining pawl for either of the ratchet wheels to prevent the wheel from slipping back as it is advanced by the feed pawl. The arm 184 of the bell crank lever 176 is provided intermediate its ends with an aperture 187 which is substantially parallelogrammatic and which may be described roughly as diamond shaped. Manifestly, the lever 176 is limited in movement by the two ratchet wheels 169. The other arm 188 of the bell crank lever 176 supports one end of the tension spring 189, the other end of which engages a spring post 191 which is so positioned that as the lever 176 shifts from engagement with one ratchet wheel to engagement with the other, the spring 189 is carried across the pivot pin 173 and serves as an over-center device for the lever 176.

An operating lever 192 for the ribbon feed mechanism is pivoted to plate 162 at 193 and carries at its inner end a pivot pin 194 on which is pivotally mounted the ratchet feed pawl indicated generally by the reference numeral 196. The feed pawl 196 is U-shaped and both arms are mounted on the pivot pin 192. The upper arm 197 has upwardly extending abutments 198, the distance between which is somewhat greater than the distance across the widened end 181 of the arm 179 of lever 174. The upwardly turned abutments 198 extend at least as high as the outer end of arm 179, so that they may engage the widened end thereof in a manner to be described. The lower arm 199 of the feed pawl 196 is formed at its outer end with ratchet wheel engaging portions 201 disposed in the plane of the ratchet wheels 169. Intermediate the ratchet engaging portion there is a depending pin 202 which extends into the diamond-shaped aperture 187 in the lever 176. A floating link 203 has one end engaging the upper end of pin 202 and the other end engaged by a tension spring 204 which is connected to the plate 162. The spring 204 and link 203 serve as an over-center device for the feed pawl 196 and bias the operating arm 192, by which the stepping pawl is carried, to the unoperated position. A power actuated lever 206 carrying a link 205 which engages the ribbon feed operating lever 192 cyclically operates the lever by rotating it clockwise in opposition to the tension of spring 204. Lever 206 is pivotally mounted at 208 (Fig. 1) and is actuated by lever arm 249, which, as will appear subsequently, is operated by a cam. Leaf springs 207 frictionally engage ratchet wheels 169 and place sufficient drag on the spool from which the ribbon is being drawn to insure tight winding of the ribbon on the other spool.

Figure 14:
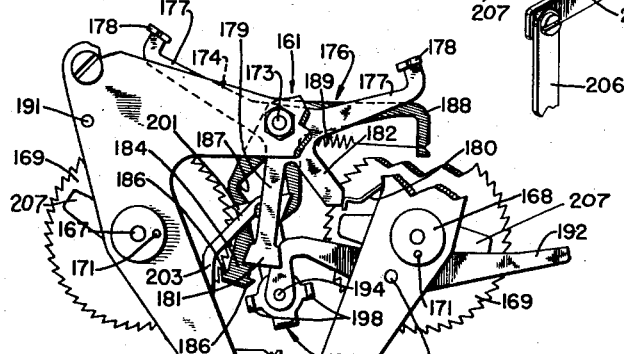
Figs. 14 and 15 are plan views of the ribbon feed mechanism showing different conditions of operation.
Figure 16:
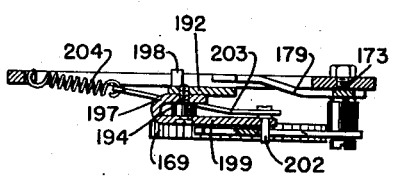
Fig. 16 is a vertical sectional view through the ribbon feed mechanism.

Referring particularly to Fig. 14 for a description of the operation of the ribbon feeding mechanism, it will be noted that pawl 196 has been pulled into engagement with the left-hand ratchet wheel 169 by the over-center device comprising the link 203 and spring 204. In this position the right-hand upwardly extending abutment 198 is somewhat nearer to the rear of the mechanism than is the left-hand abutment. It will also be noted that the spring 189 is in front of the pivot pin 173 and urges the arm 184 of retaining pawl lever 176 into engagement with the left-hand ratchet wheel 169. The operating lever 192 is periodically rotated clockwise by the operating bail 206 and in being so rotated, it moves the ratchet feed pawl 196 rearwardly of the typing unit, and the pawl, being in engagement with the left-hand ratchet wheel 169, rotates it counterclockwise. Upon restoration of the lever 192 to its unoperated position, the pawl 196 is brought into engagement with the next tooth of the ratchet wheel preparatory to the next ribbon feeding operation. As the ratchet wheel is rotated counterclockwise, the outer end of arm 184 of retaining pawl lever 176 engages successive teeth and prevents clockwise rotation of the ratchet wheel and thus restrains the ratchet from rotating with the operating pawl 196 as the latter returns to its unoperated position. It may be added that as the feeding of the left-hand ratchet wheel 169 takes place, the pin 202 carried by the feed pawl 196 moves within the diamond-shaped aperture in the retaining pawl arm 184 adjacent to the left-hand forward wall of the aperture without affecting the position of the pawl arm.

Figure 15:
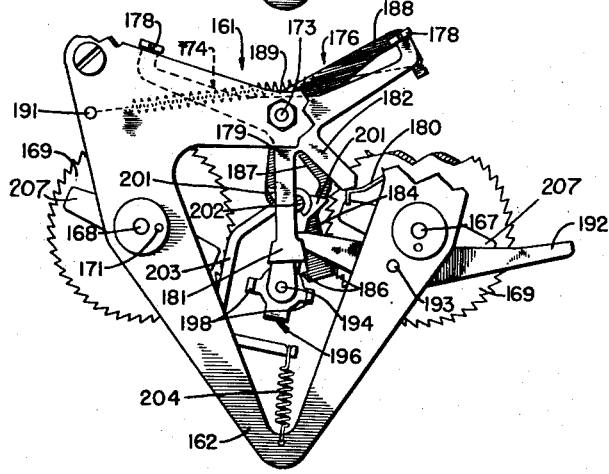

The direction of feeding of the ribbon may be reversed by rocking the lever 174 from the position shown in Fig. 14 which is the extreme clockwise position, to that shown in Fig. 15 which is the extreme counterclockwise position by either of two methods described below. Such movement of the lever 174 will carry the outer end of the arm 179 thereof out of alignment with the left-hand abutment 198 of pawl 196 and into alignment with the right-hand abutment. This operation does not in itself transfer the feeding operation from the left-hand ratchet 169 to the right-hand ratchet. The transfer of the feeding operation will occur, however, upon the next operation of the operating lever 192 by bail 206. When the lever 192 is so operated, the pawl 196 will begin to move in ratchet feeding direction in the same path that it had been following previously, but before it reaches the limit of its travel, the right-hand abutment 198 will be blocked by the widened end 181 of the arm 179 of lever 174, and further movement of the feed pawl will cause it to be rotated about its pivot pin 194 in a clockwise direction and into engagement with the right-hand ratchet 169 with the assistance of the over-center link 203 and spring 204. The bell crank lever 176 will be rocked simultaneously to its counterclockwise position due to the fact that the pin 202 is disposed within the diamond-shaped aperture 187 and will rock the lever 176 counterclockwise as the pawl 196 is shifted. The counterclockwise rotation of the bell crank lever 176 causes its over-center spring 189 to shift to the rear of the pivot pin 173.

The feeding of the ribbon in opposite directions may be controlled by manual shifting of the lever 174 if desired, but the apparatus is intended for automatic reversal of the ribbon feed by cooperation of a portion of the ribbon itself with the perpendicular arms 178 of the lever 174. Ink ribbons of the kind used in typewriters are provided near their opposite ends with small metal eyelets or other obstructions which are much wider than the thickness of the ribbons. The bifurcations in the arms 178 are too narrow to permit these eyelets or other obstructions to pass. As a result, when the end of a ribbon is nearly reached and one of the obstructions engages an arm 178 of the lever 174, the latter is rotated due to movement of the ribbon, and as soon as the lever has been rocked by the moving ribbon a distance sufficient to block one of the abutments 198 of the pawl 196, the ratchet feeding will be transferred upon the next operation of the operating lever in the manner described in the foregoing paragraph. It will be noted that due to the previously described dragging action of the leaf spring 207, which causes tight winding of the ribbon, there is no slack to be taken up when the obstruction in the ribbon encounters the perpendicular arm 178 and places the additional load of the lever 177 on the ribbon. The ribbon will thus continue to move and to be wound until the lever 177 has been shifted and the direction of feeding reversed. With this arrangement, the moving ribbon is not required to effect the actual shifting of the feed pawl from one ratchet to another against the resistance of its over-center device but merely conditions a shift controlling lever which conditions the pawl to be shifted by the power operated actuating lever upon the next operation thereof.

Operating cams

The operation of the ribbon feed bail 206, the print hammer lever 117, and the transfer bail 102 is effected by operating cams mounted on the shaft 39 above the gear 41 (Fig. 4). The operating cams are assembled in fixed relation with respect to each other on a sleeve which is mounted on shaft 39 and which has associated therewith the driven portion of a spring loaded tooth clutch 211, the driving portion of which is keyed or staked to shaft 39. A clutch throw-out lever 212 pivotally mounted on shaft 213 is spring biased into engagement with the driven portion of the clutch 211 and has an arm 214 (Fig. 2) disposed in the path of a cam projection 210 (Figs. 1 and 6) included on the selector cam barrel 62. With this arrangement, at a given point in the cycle of operation of the cam barrel 62, cam projection 210 rocks the arm 214 which withdraws the clutch throw-out lever 212 from restraining engagement with the driven portion of the clutch 211 and permits driving engagement to be established between the shaft 39 and the cams mounted thereon.

The uppermost of the cams is a channel or box cam designated by the reference numeral 216, the cam groove 217 (Fig. 9) of which receives the follower roller 218 rotatably mounted on a bell crank lever 219 rockably mounted on the pivot shaft 221. The bell crank lever 219 is articulated at 222 to a bar 223 to which it is arranged to impart a reciprocatory motion due to the fact that the cam groove 217 has one offset 224 which, when encountered by the follower roll 218, causes the lever 219 to rock counterclockwise upon its mounting shaft 221 and in this way the bar 223 is reciprocated rearwardly of the typing unit. A lever 226 is also rockably mounted upon the shaft 221 and is secured at its forward end to the cam operated bell crank 219 by a clamping bolt 227 which passes through a slot 228 in the bell crank 219. The slot 228 provides adjustability in the clamping together of the levers 219 and 226. The lever 226 is effective in the conditioning of functions when they are selected, and its operation will be described later.

Figure 9:
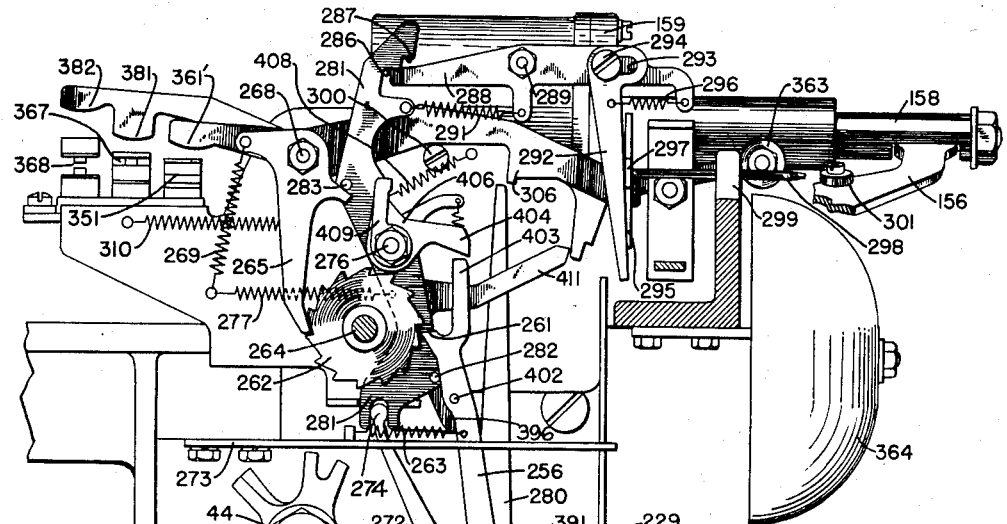
Fig. 9 is a horizontal sectional view showing the spacing and function performing mechanisms.

The bar 223 carries intermediate its ends an eccentrically mounted abutment 230 against which abuts the operating arm 229 of a striker member or hammer 231 pivotally mounted at 232 (Fig. 1). The bar 223 has a depending lug 220, and a tension spring 225 has one end connected to the lug 220 and the other end connected to the operating arm 229 of striker 231. The striker member 231 is provided at its upper end with a massive head 233 which describes an arc as the hammer 231 is rocked and which delivers a sharp blow to an impact receiving abutment 138 of resilient material, such as rubber or leather, carried by the print hammer operating lever arm 117. As indicated in Fig. 9, the offset 224 in the groove 217 of cam 216 is very abrupt and very short, so that the reciprocation of bar 223 to its rearmost position is very rapid and thus the blow imparted by the striker member 231 to the print hammer operating lever arm 117 is very sharp. The bar 223 has a further function which it performs only under certain circumstances which will be described later.

The cam which is directly beneath the cam 216 is designated by the reference numeral 107 (Fig. 11) and has been described previously as the operating cam for the transfer bail 102. No further description of this cam is considered necessary.

Figure 10:
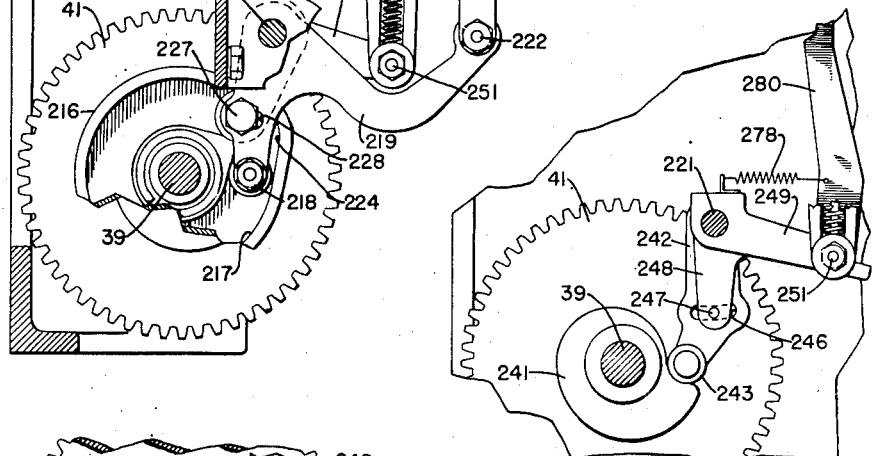
Fig. 10 is a horizontal sectional view showing details of the spacing mechanism.

The final cam in the group is disposed below the cam 107 and is designated by the reference numeral 241. This cam, as shown in Fig. 10, is contoured to impart gradual rotation to a lever 242 pivoted on the stud 221. The lever 242 has a follower roll 243 which rides against the cam 241. As shown in Fig. 10, the radius of the cam 241 increases steadily from minimum to maximum with an abrupt drop between the portions of maximum and minimum radius, and this causes the lever 242 which is pivoted on the shaft 244, to rotate counterclockwise steadily until it reaches its extreme counterclockwise position, whereupon it is restored rapidly to its extreme clockwise position. A bell crank lever which comprises a single arm 248 and two arms 249 disposed in spaced horizontal planes and in substantially the same vertical plane is adjustably connected to lever 242 by a clamping engagement afforded by screw 247 extending through slot 246 in arm 248. Near their outer ends the arms 249 support the pivot pin 251. The pivot pin 251 serves as means for articulating to the bell crank lever arms 249 a spacing pawl and a plurality of function performing bars. Cam 241 and levers 242 and 249 serve, through the elements articulated to the latter, as the means for effecting character spacing and function performance through the cooperation of elements provided therefor.

Spacing mechanism

The spacing pawl designated by the reference numeral 256 is articulated to the pin 251 through a spring yield connection comprising slot 257, spring 258, and guide pin 259 (Fig. 9). The pivot pin 251 enters the slot 257 and is urged to the forward end of the slot by the compression spring 258. The pin 259 is retained within the slot inside the convolutions of the spring 258 and prevents the spring from escaping from the slot. The normal movement of the pawl 256 is reciprocatory, due to the rocking of the bell crank lever arm 249 by the cam 241, but if the movement of the pawl 256 is blocked as it may be under certain circumstances, the pin 251 may move within the slot and the spring 258 will take up the movement imparted by the cam and will restore the pivot pin 251 to the forward end of the slot 257 when the cam follower 243 has escaped from the highest portion of cam 241. The pawl 256 has at its opposite end a ratchet engaging prong 261 which engages a ratchet 262 to impart counterclockwise rotation thereto as the pawl is reciprocated. The pawl is spring biased into contact with the ratchet by a spring 263. The ratchet 262 is fixed to a rotatable carriage spacing shaft 264 which carries at its upper end a pinion 266 (Fig. 4) meshing with a rack 267 connected to the platen carriage 141. A step-by-step movement of the carriage for letter spacing is effected by counterclockwise rotation of the spacing ratchet 262 responding to the reciprocation of the spacing pawl 256. As the carriage is stepped, it rotates the return spring drum 152 counterclockwise by drawing the belt 151 leftwardly, thus tensioning the spring and storing energy for a carriage return operation. A retaining pawl 265 (Fig. 9) pivotally mounted at 268 and urged in a counterclockwise direction by a spring 269 engages one after another of the teeth of the ratchet 262 and retains the ratchet and thus the platen carriage in the successive positions to which they are advanced by the pawl 256.

Function mechanism

The functions of the hereindescribed printing apparatus, such as "Line feed," "Shift," "Unshift," etc., are selected in accordance with stop positions of the type wheel, as determined by certain of the stop pins 96 which may be selected by the code discs 91, are conditions for operation by the lever 226 actuated by the print hammer operating cam 216, and are performed by the lever arms 249 actuated by the spacing cam 241. Any other desired functions may be selected, conditioned, and operated in the same manner, and in the present embodiment of the invention, certain other ones are so controlled, these functions providing for the operation of electrical contacts for circuit control, such as rendering the transmitting mechanism inoperative, remotely controlling apparatus for stopping the operating motor, and operating an audible signal, such as a bell.

Other functions, particularly those which may conveniently be performed with great rapidity, may be actuated directly from the print hammer operating cam 216, rather than from the less violent spacing cam 241. In the present embodiment of the invention "Carriage return" and "Space suppression" are so controlled.

Since, as hereinbefore outlined, the selection of functions is controlled in accordance with certain stop positions of the type wheel, means must be provided for effecting response of the function conditioning or performing mechanisms. Such means has been provided on the type wheel shaft 44 just above the gear 43 and comprises a plurality of index pins or abutment pins 271 (Figs. 9 and 12) disposed in various horizontal planes and in various radial positions with respect to the type wheel. In certain horizontal planes, only one index pin is found, whereas others contain several pins. The number of pins in a horizontal plane indicates the number of type wheel stop positions in which a particular function is selected. Index pins in different horizontal planes may be disposed in the same vertical plane, indicating that a plurality of functions may be selected simultaneously.

Figure 12:
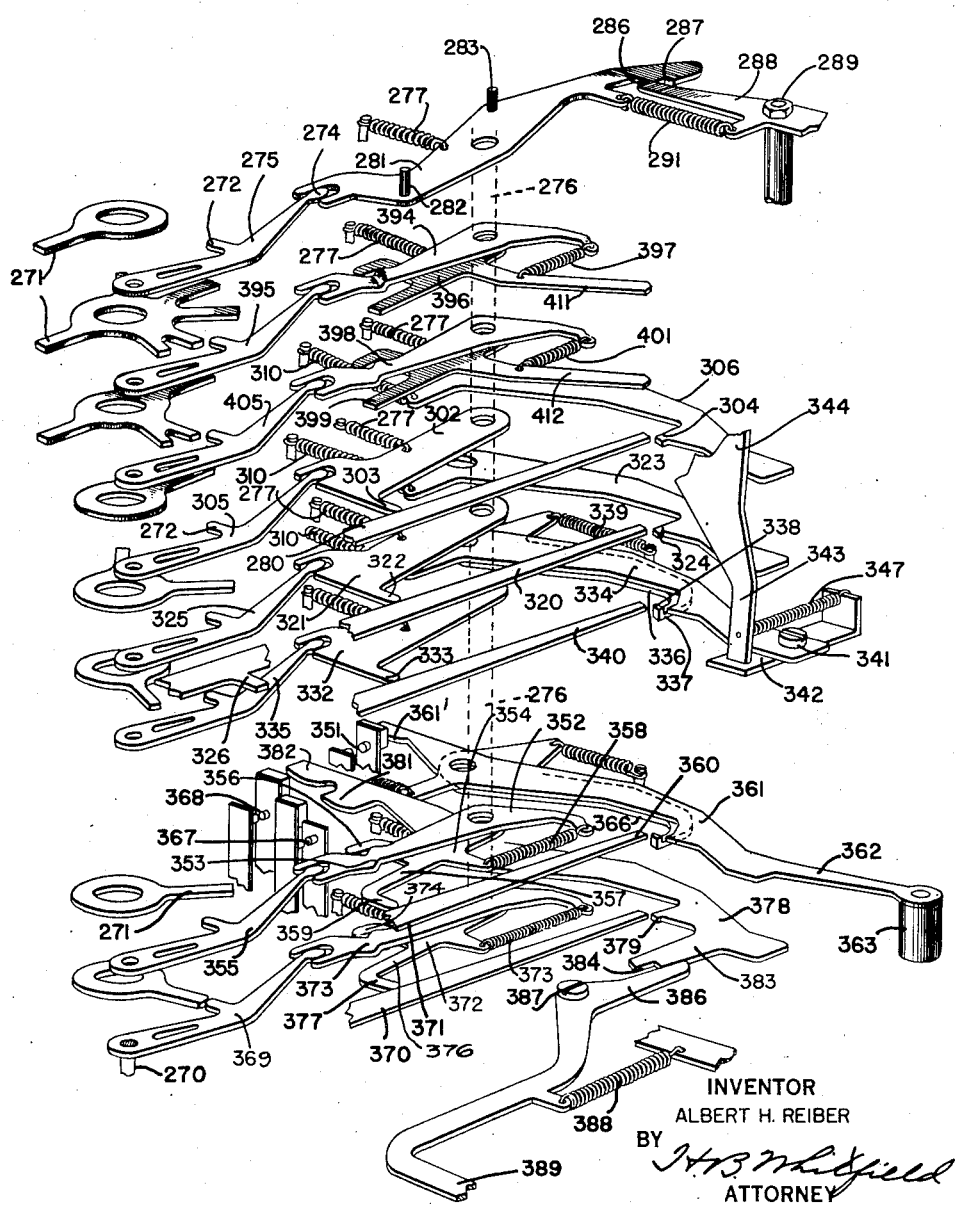
Fig. 12 is an exploded view in perspective of the function selecting and performing mechanisms.
Figure 13:
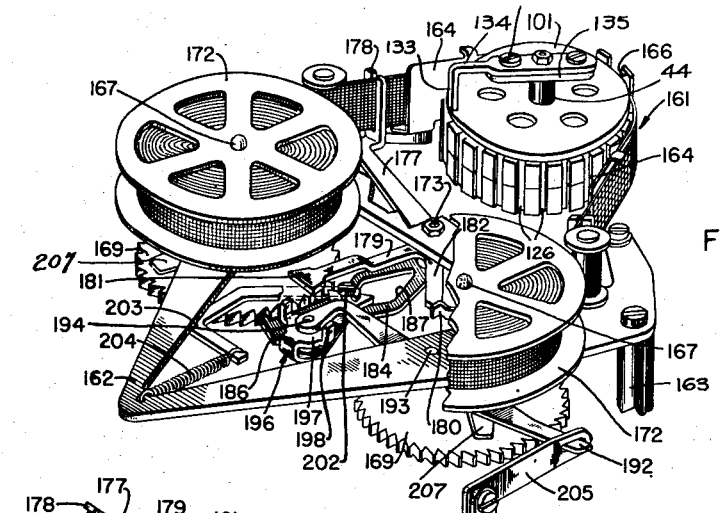
Fig. 13 is a perspective view of the ribbon feed mechanism.

For cooperation with the index pins 271 there are provided a plurality of superposed levers, the uppermost of which is designated 275 in Figs. 9 and 12, pivotally mounted at their forward ends on a pivot pin 270 carried at the rearmost end of lever 226 and extending through and supported in horizontal slots in a plate 273. The levers are aligned with the index pins 271 in the several horizontal planes, and each carries an abutment arm 272 extending leftwardly therefrom at a point on the lever toward which the associated type wheel shaft index pin 271 points when the shaft is stopped in the position to select the function represented by that pin. At their rearmost ends the lever 275 and corresponding levers are provided with disc-like portions 274 disposed in notches in the forward ends of associated function levers which are pivotally mounted on the pivot shaft 276 and which will be identified by individual reference numerals in the description of the several function operations.

Since the lever 275 and corresponding levers are articulated to the lever 226 (Fig. 9), they undergo movement when the print cam 216 operates lever 226, and a lever such as 275 associated with selected index pin 271 moves differently than do those associated with unselected index pins. The function levers to which the lever 275 and corresponding levers are articulated by their disc-like portions 274 are biased to their unoperated positions by springs 277, and they rotate in opposition to the tension of such springs only when forced to do so. When the lever 226 is actuated by cam 216, it carries the pivot pin 270 leftwardly as viewed in Fig. 9, and with it the forward ends of lever 275 and those disposed below it. If no index pins 271 are aligned with the abutment arms 272, the lever 275 and corresponding levers pivot about their disc-like portions 274 and rock idly. If, on the contrary, an index pin is aligned with an abutment arm 272, it blocks the leftward movement of that arm, and becomes a fulcrum for the particular lever, thus causing the lever to operate as a first class lever to actuate its associated function lever and rotate the latter counterclockwise.

Certain of the function levers operated by the lever 275 and corresponding levers are adapted to perform the associated function and others are adapted to condition a function. The conditioning is effected through superposed function performing bars, the uppermost of which is designated 280, pivotally mounted on the pivot pin 251 carried by the spacing cam operated bell crank lever arms 249. The function bar 280 and corresponding bars are supported intermediate their ends in spaced horizontal slots 279 in the vertical plate 273 (Fig. 1). They are reciprocated rearwardly when the bell crank lever arms 249 are rotated counterclockwise by cam 241 and they may rotate about the pivot pin 251 within the confines of their supporting slots 279. They are biased counterclockwise by springs 278.

Fig. 12 displays an exploded perspective view of the function conditioning and performing levers and also shows the relative angular positions of the index pins 271 when the lowermost pin is selected. The mechanism for performing the several functions will be described, and reference will be made to other figures in which parts of the function performing mechanisms are shown.

Carriage return

The uppermost index pin 271 and lever 275 are associated with the restoration of the platen carriage 141 to line beginning position, which is accomplished by withdrawing the spacing pawl 256 and retaining pawl 267 (Fig. 9) from engagement with the feed ratchet 262, whereupon the spring loaded drum 152 acts through the belt 151 to restore the carriage to its extreme righthand position. The function lever to which the lever 275 is articulated is designated 281, and this lever is rotated counterclockwise when the uppermost index pin 271 is effective upon its associated lever 275. The lever 281 carries upstanding pins 282 and 283 located at the left and right of the spacing pawl 256 and the retaining pawl 265, respectively, and in close proximity thereto. When the lever 281 is rotated counterclockwise, it moves the pins 282 and 283 to right and left, respectively, and the pins rotate the spacing pawl 256 and retaining pawl 265 clockwise about their pivotal mountings 251 and 268, respectively, to withdraw the pawls from engagement with the ratchet 262. The carriage, being under no other restraint, responds to the force exerted by the spring in the drum 152 and moves to its extreme righthand position, rotating the spacing ratchet 262 clockwise as it does so.

It will be noted that the lever 281 is provided, near its rearmost end, with a notch in which are formed shoulders 286 and 287 (Fig. 12). A latching lever 288 is pivotally mounted at 289 and is biased for clockwise rotation by spring 291 which has one end connected to the lever 288 and the other end connected to the function lever 281. When the function lever 281 is in its unoperated or extreme clockwise position as viewed in Figs. 9 and 12, the lever 288 is held in engagement with the shoulder 286 by spring 291. The rocking of the function lever 281 counterclockwise to effect a carriage return operation permits the lever 288 to escape from the shoulder 286 and to come to rest against the shoulder 287 whereby the function lever 281 is latched in its operated position to maintain the pawls 256 and 265 out of engagement with the ratchet 262. The purpose of latching the function lever 281 in the operated position is to permit the carriage 141, which may bounce slightly as it comes into engagement with the dashpot controlled lever 156 or the stop screw 154, to settle into its extreme right-hand position before the pawls are permitted to reengage the spacing ratchet 262. Manifestly, the function lever 281 must be unlatched before any carriage spacing operation can occur and an arrangement has been provided whereby the lever 281 is unlatched upon the next operation of the cam 216.

The arrangement includes a lever 292 (Fig. 9) which has a slot 293 which is entered by a screw 294 carried by lever 288. The slotted engagement between lever 288 and lever 292 provides a yielding connection, and a spring 296, which has one end connected to the lever 292 and the other end connected to an extension of the lever 288, tends to rotate the lever 292 in a counterclockwise direction which is prevented by a lug 297 carried by a fixed plate 295 against which the lever 292 rests. Since the spring 296 is disposed between the lug 297 and the screw 294, the extreme left end of the slot 293 abuts against screw 294. A rod 298 is slidably supported in the lug 297 and in a portion 299 of the frame of the mechanism and occupies the same horizontal plane as the lever 292. The rod 298 slides freely within frame member 299 and the lug 297 and is urged to its rightward position by the lever 292. The lever 156 which is articulated to the dashpot plunger rod 158 carries an eccentrically mounted adjustable abutment 301 in alignment with the right-hand end of the rod 298. The abutment 301 is similar to the previously described abutment 230 and is below the pivotal mounting 157 of the lever 156 so that it is moved toward the rod 298 as the carriage 141 rotates the lever 156 clockwise at the completion of a carriage return operation. When the lever 156 comes to rest in its extreme clockwise position at the conclusion of the carriage return operation, its abutment 301 moves the rod 298 leftwardly a distance sufficient to cause it to rotate the lever 292 clockwise and position the forward end of that lever in alignment with the rod 223 articulated to the bell crank lever 219. Lever 292 will occupy this position as long as the carriage 141 is in its extreme right-hand position and upon the next counterclockwise rocking of the bell crank lever 219 by the box cam 216, rod 223 will be reciprocated rearwardly and will communicate its reciprocating motion to lever 292, which will cause the latching lever 288 to be rotated counterclockwise out of engagement with the shoulder 287 and into engagement with the shoulder 286. The function lever 281 will thus be restored to its unoperated positon and the pawls 256 and 267 will reengage the spacing ratchet 262 in preparation for normal spacing operations. The slotted mounting of lever 292 provides a yield connection which may, under certain circumstances, operate yieldingly on account of a blocking condition. The carriage 141 may, particularly if it travels through only a short distance in returning to its extreme right-hand position, reach that position while the bar 223 (Fig. 9) is being operated by the cam 241 and before the bar has been withdrawn to its foremost position. Under this condition the rod 298 might jam the forward end of lever 292 against the right-hand face of operating bar 223, whereby the rod 298 might be prevented from traveling its normal distance and the carriage 141 be prevented from assuming its extreme right-hand position. The slotted connection permits the lever 292 to be fully moved by the rod 298, even should the forward end of lever 292 be blocked by bar 223.

Shift and unshift mechanisms

It will be convenient to postpone the description of the functions associated with the multiple sets of index pins occupying the second and third positions from the top on the type wheel shaft 44 until the remaining functions have been described, the reason for such postponement being that the description of the functions thus passed over will be more readily understandable. Accordingly, attention is directed to the function lever 302 (Fig. 12) carried by the shaft 276 in alignment with and articulated to the lever 305, which is associated with the index pin in the fourth level from the top. The function lever 302 is associated with the shift operation by means of which the type wheel is shifted to remove one of the annular sets of type pallets from alignment with the print hammer 136 and to bring the other set of type pallets into alignment therewith. The lever 302 does not perform the shift function but merely establishes a condition as a result of which the function may be performed, and to this end it is provided with a projection 303 which occupies the same horizontal plane as the bar 280. This bar has its rearmost end disposed slightly to the left of a latching projection 304 of a latching lever 306 which is pivotally mounted on shaft 268 (Fig. 9) and is biased in a clockwise direction by spring 310. All levers corresponding to lever 306 are biased clockwise by springs 310 and are limited by abutment against stud 300 (Fig. 9). Upon the selection of the index pin associated with the lever 305, and upon the operation of that lever, the lever 302 is rotated counterclockwise similarly to the previously described function lever 281, and through its projection 303 it imparts a clockwise rotation to the bar 280. The latter bar, in rotating, moves to the right of latching projection 304, and at the same time it moves rearwardly due to operation of bell crank lever arms 249 by cam 216, and becomes latched in its clockwise position.

The bar 280 carries on the right side thereof a projection 307 which is disposed in alignment with the lower end of a shifter lever arm 308 (Figs. 7 and 8) to which it imparts a counterclockwise motion as viewed in Fig. 7 as the bar 280 is reciprocated rightwardly due to continued counterclockwise rocking of the bell crank lever arms 249 by the cam 241. The shifter lever arm 308 is one arm of a bell crank lever pivotally mounted upon the previously described pivot shaft 232 and having its other arm 311 extending rearwardly of the printer. The lever arm 311 is bifurcated at its outer end and has disposed in the bifurcation a pin 312 carried by arm 313 of shifter frame 314. The frame 314 is mounted on shaft 232 by means of slot 316 so that it may be raised and lowered vertically to lift and lower the type wheel through its horizontal arm 317 (Figs. 1 and 4), which is guided on guide screw 315 and which engages the type wheel hub 123. The operation of the lever arm 308 upon the shifter frame 314 is to lift the latter through the articulation of the lever arm 311 to the frame 314 by virtue of the pin 312. The frame 314 carries a pivoted spring loaded detent 318 which has notches at the lower end thereof, either of which may engage a bushing 319 on the shaft 232 to maintain the shifter frame 314 in a position to which it is moved. A spring 314' (Fig. 1) counterbalances the shifter frame 314 and type wheel 101, and thus equalizes the forces required to effect shift and unshift operations.

Referring again to Fig. 12, it will be observed that a function lever 321 similar to the lever 302 and having a projection 322 is pivotally mounted on the shaft 276 below the lever 302 and in articulation with the lever 325. Two angularly spaced index pins 271 are disposed in the same horizontal plane as the levers 321 and 325, which indicates that there are two stop positions of the type wheel shaft which will result in operation of the function lever 321. Lever 321 is associated with the unshift function of the printer. An operating bar 320 is aligned with the function lever projection 322 and is also aligned with a latching lever 323 below and similar to the latching lever 306 and provided with a latching projection 324. The operating bar 320 is articulated to the pivot pin 251 directly below the operating rod 280 and is provided at the side thereof with a projection 326 (Fig. 7) which, when the rod is latched in its extreme clockwise position by the projection 324 of lever 323, is disposed in operating alignment with a lever arm 327 similar to the lever arm 308 but necessarily slightly longer than that lever. The lever arm 327 constitutes, together with a forwardly extending arm 328, a bell crank lever pivotally mounted upon the pivot shaft 232. The outer end of the lever arm 328 is bifurcated similarly to the lever arm 311 and engages a pin 329 carried by a forwardly extending arm 331 of the shifter frame 314. When the lever arm 327 is rocked in counterclockwise direction due to movement of the projection 326 of the operating bar 320, the lever arm 328 will also be rocked counterclockwise and will move pin 329 downwardly, whereby shifter frame 314 is moved downwardly to effect an unshift operation. It is apparent that the lever arms 308 and 327 operate oppositely and simultaneously so that as one effects movement of the shifter frame, the other is oppositely rotated and presented in position to be next effective in the shifting of the shifter frame 314.

It was previously mentioned that the unshifting operation conditioned by the function lever 321 and performed by the bar 320 may be selected for either of two stop positions of the type wheel shaft, as indicated by the presence of two index pins 271 in the same horizontal plane, either of which may be effective. One of the pins is associated with the unshift signal and is presented in operating position when the signal combination assigned to unshifting is received. The other pin is presented in operative position when that code combination is received which is assigned to spacing, for the reason that it has been found that in many instances printing following a blank spacing operation is to be effected with an unshift condition of the printing mechanism, and it is therefore convenient to effect the unshifting automatically simultaneously with the spacing, thus obviating the transmission of a separate unshift code combination.

*Line feed*

The single index pin immediately below those assigned to the unshift function is associated with the line feed function which is a function accomplished by rotating the printing platen 139 to advance a sheet or web of paper upon which printing is to be effected through a distance sufficient to present a line of blank paper to the printing position. The selection of the line feed index pin and the rocking of the lever 335 (Fig. 12) against the pin causes the operation of a function lever 332 which is similar to the levers 302 and 321 and which has a projection 333 for operating the associated function performing bar 340. A function operating lever 334 is pivotally mounted below the latch lever 323 on the pivot shaft 268 and is similar to that lever except that it has operative connection with the line feeding mechanism, as will be described, and is therefore a true function performing lever, and it has no latching projection. A separate latching lever 336 is provided which is also pivotally mounted on the pivot shaft 268 and which has at its right-hand end a forwardly projecting arm 337 which terminates in an upwardly turned projection 338 which occupies a position with respect to the lever 334 corresponding to the latching projections 304 and 324 of levers 306 and 323, respectively. The lever 336 is spring biased in a clockwise direction by spring 339, movement in that direction being limited by the stud 300 (Fig. 9), and it is capable of counterclockwise rotation independently of the lever 334 to permit it to be cammed in a counterclockwise direction by the operating bar 340 and to return to its extreme clockwise position where its latching projection 338 latches the operating bar 340 in conditioned position. When the function bar thus latched is reciprocated rearwardly in the manner common to all of the function performing bars, the lever 334 is rotated counterclockwise about the pivot 268. The lever 334 has secured thereto at its right-hand end by screw 341 a link 342 which is provided with a slot in which is disposed the operating arm 343 of a line feed bail 344. The bail 344 (Figs. 4 and 21) is pivotally mounted in suitable brackets 346 on the rear of the machine and extends slightly above the lower end of the previously described line feeding lever 160. The lever 160 travels with the carriage 141 and the extent of the bail 344 transversely of the machine is slightly greater than the travel of the lever 160, so that the lever may be engaged by the bail at any position in the travel of the carriage. The line feed lever 160 is provided with an anti-friction roll 148 which constitutes means for engagement of the bail 344 with the lever 160. A certain amount of freedom is provided in the interconnection between the link 342 (Fig. 12) and the lever 334 to permit the link to rock with respect to the lever. The slot into which the arm 343 of the bail 344 enters also provides limited freedom necessitated by the rocking movement of the arm 343 within the reciprocated link 342. A tension spring 347 keeps the arm 343 from chattering within the slot in the link 342.

The provision of a separate latching lever 336 for latching the operating bar 340 in position to operate the function performing lever 334 instead of providing the lever 334 with a latching projection as in the case of levers 306 and 323, is a result of the fact that the lever 334 has articulated to it the relatively massive line feed bail 344, whereas the levers 306 and 323 are merely latching levers and are not articulated to any function performing mechanism. Any of the levers 306, 323, or 334 may bounce, upon being engaged by the associated operating bar. The levers 306 and 323 being light, return substantially instantaneously to their extreme clockwise positions after being thus bounced, and latch the bars 280 and 320 in function performing position. Should the lever 334 be provided with a latching projection and be depended upon to latch its associated bar 340 in conditioned position, it might in some instances bounce away from the bar 340 or be slow in returning for a repetition of the function, and fail to return to its extreme clockwise position quickly enough, due to the mass articulated to it, to latch its associated function bar 340. In order that such possibility may be avoided, the light and readily responsive latching lever 336 is provided and the function performing lever 334 is not depended upon to accomplish the latching operation.

*Electrical contact or signal bell mechanism*

The next function mechanism, which includes only a single index pin 271, is associated with electrical contact means designated 351. In the showing in Fig. 12, the contact means is arranged to be closed but it may equally well be normally closed contact means arranged to be opened. The contact means may be employed in any desired circuit for any desired purpose, such as, for example, the control of mechanism for stopping the operating motor 34, such as the mechanism disclosed in United States Patent No. 1,964,268, granted June 26, 1934, to O. A. Morgenstern.

As shown in Fig. 12, a function lever 352 adapted to be actuated by its associated lever 355 is rotatably mounted on the shaft 276 just below the function lever 332. It will be noted that this lever differs from the levers 302, 321, and 332 in two respects, one of which is that there is an offset 353 in the forward portion of the lever, and that it has no projection for the conditioning of the associated function bar 360.

A lever 354 is pivotally mounted on the shaft 276 just beneath the lever 352 and is provided at its forward end with arms 356 and 357 spaced apart a distance greater than the width of the offset portion of lever 352 and between and in the plane of which the offset portion of lever 352 is disposed. A spring 358 connects the levers 352 and 354 and impresses opposite biasing upon them so that in the absence of restraint upon either lever, the offset portion of lever 352 is presented against the arm 356 of lever 354, which is the normal or unoperated position of the levers. The spaced arms 356 and 357 and the spring 358 constitute a yield connection between levers 352 and 354, and permit the lever 352 to be operated by its associated lever 355 even though lever 354 be restrained from operating, under circumstances, by apparatus, and for reasons which will be hereinafter described. If the lever 354 is restrained from operating, the operation of lever 352 is idle, because lever 354 is the one which conditions the associated function bar 360 and is provided, for that purpose, with the projection 359 which becomes effective upon the function bar 360 to shift it to latched position. In the particular embodiment of the invention shown herein, the function performing lever which is adapted to be operated by the function bar 360 is designated 361 and is provided with contact operating means 361' at one end and at the opposite end with an arm 362 provided with a bell striker 363 adapted, upon the return or restoration stroke of lever 359, to strike and sound bell 364, adjustably mounted by slot 365 (Fig. 3), shown in Figs. 1, 2, and 3. It may not always be desirable to have simultaneous operation of electrical contact means and signal bell, and in that case, if signal bell only is desired, the electrical contacts may be omitted or may be left unconnected, or the contacts may operate a remote signal device. If signal bell operation is not desired, which is usually the situation when the contacts are used to control motor stop mechanism, the bell 364 may be moved, by virtue of its mounting slot 365, out of range of striker 363.

Since the striker 363 is of appreciable mass, it is desirable not to rely upon the lever 361 to latch the associated function bar 360, for the reasons stated in the description of "Line feed" operating lever 334. Accordingly, a latching lever 366 similar to the latching lever 336 is associated with the function performing lever 361 in the same manner that the latching lever 336 is associated with the lever 334.

*Send and receive control*

The combination of levers and elements associated with the lowermost index pin 271, which is the one shown in selected position, is effective to operate electrical contact means 367 and 368, one of which may be normally closed and the other of which may be normally open and which may, for example, be operative to change the printing and transmitting mechanism from sending and receiving condition to receiving only condition in accordance with the teachings of United States Patent No. 1,904,164, granted April 18, 1933, to S. Morton et al. For the operation of the contact means, there are provided, in addition to the lever 369 and function bar 370 associated with this function, levers 371 and 372, and spring 373 similar to the previously described levers 352 and 354 and spring 358, and mutually related in the manner in which those elements are related. The lever 371 has the offset 373 intermediate the arms 374 and 376 of lever 372 and the arm 376 has the projection 377 which operates upon the lowermost function bar 370 to condition it to operate on the function lever 378. This function lever has no massive elements connected to it and therefore it is provided with a latching projection 379 similar to that carried by the levers 306 and 323, and a separate latching lever such as the lever 336 is not required, although a separate latch lever may be used with any of the functions. When the lever 378 is rotated counterclockwise by operation of the function bar 370 associated therewith, it operates the electrical contact means 367 and 368 by contact operating projections 381 and 382 with which it is provided.

Since the function lever 378 is operated for the purpose of rendering the transmitting mechanism inoperative and thus incapable of disturbing reception, it is apparent that it will be desirable to maintain the electrical contact means 367 and 368 in the condition which is established by operation of the lever 378 in order that the mechanism may remain in receiving condition for the reception of a message. This may be effected by latching the lever 378 in its operated position. Accordingly, the lever 378 has been provided with an arm 383 which is provided at its outer end with a notch 384, thus affording a latching shoulder. A latching lever 386 is pivotally mounted at 387 to drop into the notch 384 when the lever 378 is moved to its operated position, the latching lever 386 being biased in a counterclockwise direction by the tension spring 388. The only circumstances under which it will be desirable to release the lever 378 from the latch 386 is to restore the mechanism to transmitting condition, which may be accomplished manually by rotating the latch 386 clockwise by means of the handle portion 389.

*Function suppression*

The functions assigned to the levers 361 and 378 may, if desired, be arranged to be performed upon selection of their associated index pins only if the type wheel and its shifter frame 314 occupy a particular position, such as the upper case position, which is also known as the "figures" or shift position. With this arrangement, the function will not be performed when the type wheel, while occupying the lower or unshift position, is stopped in its rotation to align the index pin of either of the functions with the projections on the levers 355 or 365, respectively, for which it will serve as a fulcrum. Thus, for a particular stop position of the type wheel, a character may be selected and printed from the unshift group of characters on the type wheel, and no selectable function be performed; whereas the performance of a shift function followed by the stopping of the type wheel at the same stop position may result in the performance of a function with or without the printing of a character, depending upon whether or not the type pallet then aligned with the print hammer carries a character. The aforedescribed association of a character printing operation and a function, between which a selection may be effected, may be accomplished by blocking the function in one of the case shift positions of the type wheel and permitting the normal performance of the function in the other case shift position in the manner now to be described.

Figure 3:
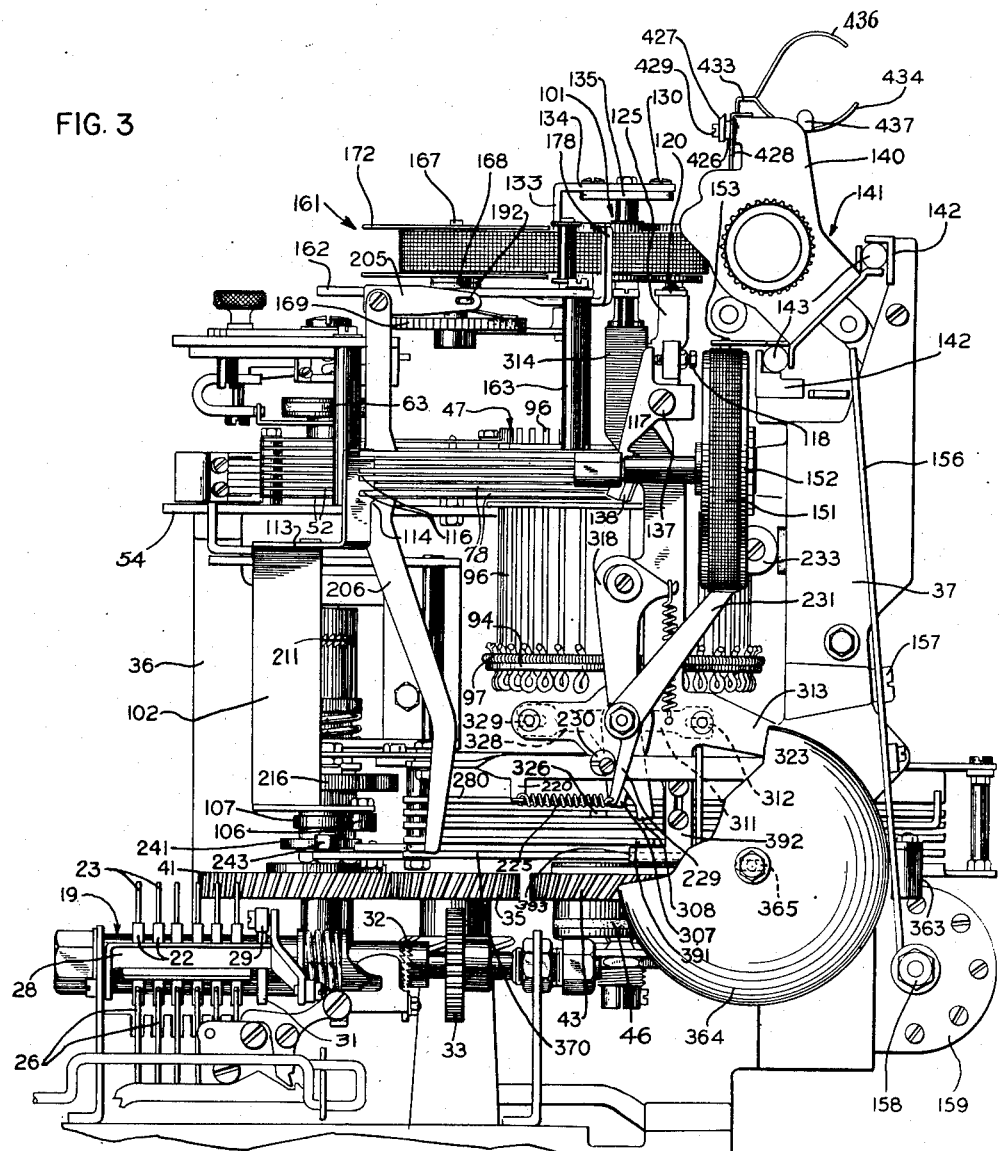
Fig. 3 is a side elevation of the transmitting and receiving mechanism.

It will be noted, by reference to Fig. 9, that there is shown a projection 391 extending rightwardly from at least one of the function bars below the bar 280. The function bars 360 and 370 assigned to the operation of function performing levers 361 and 378 may be provided with projections 391. As shown in Fig. 3, there is adjustably secured to the bottom of the shifter frame 314 a depending bar 392 provided with a horizontally extending projection 393. The projection 393 is so disposed that it is moved into or out of alignment with one of the function bar projections, in close proximity thereto, as the shifter frame 314 is moved from one of its positions to the other. The projection 393 shifted by the frame 314 may be provided for blocking each function bar projection 391 in the particular case shift condition in which it is to be blocked.

The blocking of a function bar, such as the bar 360 or 370 by the blocking of its projection 391, prevents clockwise rotation of the bar by its function lever, such as the lever 354, and thus prevents its being latched in position to actuate its function performing lever, such as the lever 361. Of course, the lever 352 is rotated even though the associated function is blocked, but the spring 358 yields and permits the lever 354 to remain stationary. The blocking of a function in the manner described can only be accomplished where a yielding arrangement, such as that afforded by the coaction of levers 352 and 354, or levers 371 and 372, is provided, and this is the principal reason for providing these combinations of levers instead of single levers such as the lever 332, with functions that may be suppressed.

*Space suppression*

Two other functions that are subjected to suppression are those represented by the clusters of index pins in the second and third horizontal levels of index pins from the top. These functions were not discussed in the foregoing descriptions of the several functions, and they will now be described. The functions now under consideration are identical in character but are effected under varying conditions and are designated "Space suppression." It will be understood, from description hereinbefore presented, that for each cycle of operation of the cam barrel 62 the clutch throw-out lever 212 will be operated and the clutch 211 will drive the spacing cam 241 which will, in turn, cause the spacing pawl 256 to drive the spacing ratchet 262, unless a space suppressing or preventing mechanism intervenes. Spacing is thus seen to occur cyclically unless prevented. Spacing is usually desired after the printing of each character, in order to present an unprinted portion of the page to receive the next character. However, with certain functions, such as shift, unshift, and possibly others, a spacing operation may cause a space to be inserted in the printed matter at a point where none is desired. This can be overcome by suppressing the spacing operation when a function is performed.

As shown in Fig. 12, there is associated with the uppermost cluster of index pins 271, through the lever 395 a combination of levers comprising levers 394 and 396 similar to the previously described levers 352 and 354 and similarly interconnected by a tension spring 397. Also there is associated with the next cluster of index pins 271, through the lever 405, a combination of levers 398 and 399 similar to levers 394 and 396 and similarly interconnected by a spring 401. As shown in Fig. 9, the spacing pawl 256 is provided with a downwardly extending pin 402 which is in close proximity to the levers 396 and 399 and which is of sufficient length to be engaged by either of said levers upon counterclockwise rotation thereof. Engagement between the pin 402 and the rotating lever 396 or 399 causes the pawl 256 to be moved clear of the spacing ratchet 262. Accompanying rearward reciprocation of the pawl 256 by the action of spacing cam 241 causes the extended arm 403 (Fig. 9) of the pawl to engage pawl withholding arm 404 of a lever 406 which is pivotally mounted at 276 and is biased clockwise by a spring 408 into engagement with a depending portion of an adjustably fixed stop 409. The arm 404 of lever 406 thus holds spacing pawl 256 out of engagement with spacing ratchet 262 during one cycle of operation of cam 241. When the pawl 256 performs a normal spacing operation, arm 403 thereof engages arm 404 of lever 406 and rotates the lever idly in counterclockwise direction.

It will be observed in Fig. 12 that levers 396 and 399 are provided with arms 411 and 412, respectively. These lever arms terminate in close proximity to downward projection 413 of arm 313 of type wheel shifter frame 314 (Figs. 7 and 8). Projection 413 is provided with shoulder 416 which blocks arm 411 of space suppression lever 396 when the shifter frame 314 is in its lower or unshift position and is also provided with shoulder 417 which blocks arm 412 of space suppression lever 399 when the shifter frame is in its upper or shift position. Blocking of the lever arms 411 or 412 results in prevention of operation of levers 396 or 399, respectively, and thus one set of space suppression index pins is effective only in upper case selections and the other set is effective only in lower case selections. The yieldable interconnection of levers 394 and 396, and of levers 398 and 399 permits the blocking of levers 396 and 399 in the same manner that the blocking of levers 354 and 372 may be permitted.

It will be noted that the upper cluster of space suppression index pins contains more pins than the lower cluster, which indicates that space suppression occurs in connection with a greater number of upper than lower case selections. It will also be noted by reference to relative positions of pins in the two clusters, that spaced suppression occurs in association with certain selections irrespective of the shift or unshift condition of the printer.

*Operating cam sequence*

From the foregoing description of the various functions it will be observed that the cams 216 and 241, besides performing the printing and spacing operations, respectively, also figure prominently in the performance of the functions. It is therefore deemed advisable to discuss the sequence of operations performed by these cams and in such description it will be convenient to include the operation of the transfer bail cam 107. The description will refer particularly to Figs. 9, 10, and 11, from which comparisons may be drawn.

Figure 11:
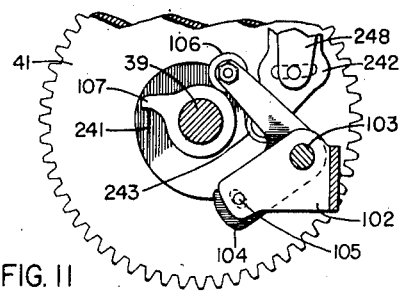
Fig. 11 is a horizontal sectional view showing details of the transfer mechanism.

The cams 216, 241, and 107 have been shown in Figs. 9, 10, and 11, respectively, in their stop positions and since, as previously stated, the cams are fixed to a sleeve carried by the shaft 39, the sequence of operation when driven by the tooth clutch 211 is as indicated in the three figures. It will be observed that the centers of cam followers 218 and 243 are disposed at the right of the cams 216 and 241 on a line parallel to the path of travel of the carriage 141 and that the cam follower 106 of the transfer bail 102 is displaced angularly in counterclockwise direction from the cam followers 218 and 243. In the stop positions the cam follower 218 is about to enter the offset in cam 216, the cam follower 243 engages the lowest point of cam 241, and the cam follower 106 is in engagement with a long dwell which constitutes the lowest portion of the cam and will not be moved by the cam until the latter has rotated through a substantial angle. When the cams begin to rotate due to operation of the clutch throw-out lever 212, the bell crank lever 219 which controls printing is rocked almost immediately, due to the presentation of the offset 224 to cam follower 218. Simultaneously with this operation, the lever arms 249 are rotating relatively slowly counterclockwise due to the steady rise of the surface of cam 241. As the bell crank lever 219 is being restored to its normal position after being operated, the transfer cam follower 106 begins its outward motion due to the fact that it encounters the sharp rise indicated in Fig. 11 and thus it effects the transfer operation after the bell crank lever 219 has been returned to its unoperated position. After the operations performed by cams 107 and 216 have been completed, the cam 241 continues to operate upon its follower 243 and the highest point on the cam is reached just before the cams return to their stop position.

It was stated in connection with the description of the several functions that a function bar such as 280 is being reciprocated rearwardly as it is rocked clockwise due to operation of the lever 305 and the lever 302. It will now be clear that this double movement occurs by reason of the fact that the cam 216 operates the levers 305 and 302 and that while these levers are being operated, cam 241 is moving the bar 280 rearwardly.

As previously stated, the operation of the cams 216, 241, and 107 is related in time to the operation of the cam barrel 62, due to the fact that the clutch throw-out lever 212 is tripped by a cam projection 210 on the cam barrel 62. In the preferred embodiment of the invention, the clutch throw-out lever 212 is tripped at an instant in the cycle of operation of cam barrel 62 which will permit printing and transfer operations to be consummated before the next group of signal impulses begins to be received. Thus the interval which begins with the beginning of rotation of the cam barrel 62 in response to a start signal and which ends with the conclusion of one revolution of the cams 216, 241, and 107 is occupied first in the setting of the selector fingers 51 in accordance with a signal combination, next with the operation of levers 219 and 226 by cam 216 to effect printing of a character or conditioning or operation of a function in accordance with the setting of the code discs 91, next the operation of the transfer bail 102 by cam 107 to transfer the setting of the fingers 51 to the discs 91, and lastly the completion of the operation of cam 241 to effect spacing or function operation. A printing operation occurs between the setting of the selector fingers 51 and the setting of the code discs 91 and therefore it will be obvious that the printing cannot relate to the character selected but must relate to the characer previously selected because the latest selection has not yet been transferred to the code discs 91. Such a condition results in storage of a signal combination in the code discs, if the cam barrel 62 is brought to its stop position and held there, which will result in stopping of the cams 216, 241, and 107 after the completion of their cycle of operation. The stored signal combination can be rendered effective by applying another signal combination to the selector magnet 67 which will result in another cycle of operation of the cam barrel 62 and cams 216, 241, and 107. The printing of characters and the performance of functions always lags one signal combination behind the operation of a key lever, or the reception of a signal combination by the magnet 67. The final character in a message may be cleared out by an idle operation of a key lever, preferably to store a signal combination representing some function such as unshift rather than a character selection.

The storing of a signal combination creates a condition with reference to one of the functions which merits description. This function is performed by the function bar 370 and function lever 378 (Fig. 12), and is that function by the operation of which a remote printing mechanism may be placed in receiving only condition and latched in that condition by the latching lever 386. This function is commonly called "Send-receive break" and results in the operation of electrical contact means 367 and 368 to effect circuit control in a manner which will be described later. It is customary to associate this function with the blank or all-spacing signal which in a current-no current signalling system may be impressed upon the line by operating blank key lever or by opening a key 467 (Fig. 23) in the line to establish a continuous spacing signal condition on the line. When this is done, the function lever 378 at all printers connected to the line will be latched in operated position by their respective latches 386, and in addition, the code discs 91 will be left in position to store another all-spacing signal combination. The printing mechanism at the point at which the send-receive break signal was impressed upon the line will have been latched in non-transmitting condition the same as all other printers connected to the line. The preferred operating practice for restoring one of the transmitting and receiving sets to transmitting condition is to release the latch 386 by means of its handle portion 389, and to hold it released while depressing one of the key levers, such as the unshift or "letters" key lever, to dissipate the stored all-spacing signal and prevent it from again operating and latching up the function lever 378.

Paper guiding mechanism

As has been previously stated, the printing platen 139 is rotatably supported in the end plates 140 of a movable carriage 141 (Figs. 1 and 17). Carriage 141 supports an arcuate paper guiding plate 421 which extends around the lower portion of the platen and is conformed to the contour thereof. The arcuate plate 421 is provided with bearing members 422 in which are supported shafts 423 (Figs. 4 and 17). The shafts 423 have mounted thereon pressure rolls 424 and the plate 421 is provided with apertures in registry with the pressure rolls 424 to permit the rolls to frictionally engage the platen when no paper is inserted in the carriage and to frictionally engage paper upon which characters are to be printed.

The end plates 140 are provided with inwardly turned ears 426 which support in abutment with the forward faces thereof a paper tear-off blade 427 and which support in abutment with the rearward faces thereof a paper guilding plate 428. Mounting screws 429 secure the blade 427 and guide plate 428 to the ears 426 and the blade 427 and plate 428 are spaced apart a distance equal to the thickness of the ear 426, whereby there is provided a space through which may be guided paper passing upwardly from the platen after having been fed between the platen 139 and arcuate guide plate 421. The lower edge of the guide plate 428 is disposed in close proximity to the platen 139 and the plate functions after the manner of a stripper to guide the paper away from the platen. Guide fingers 431 are adjustably mounted by screws 432 upon the tear-off blade 427 and the fingers extend downwardly and overlap the arcuate plate 421 so that paper emerging from between the platen 139 and arcuate plate 421 is guided to the passage space between the tear-off blade 427 and the guide plate 428.

The printer herein described is adapted to print upon page width paper and the paper may be in the form of single sheets or a continuous web. An arrangement for supporting a roll of paper is shown in Figs. 4, 17, and 18 and comprises a bar 433 having at the ends thereof rearwardly extending concave roll supporting arms 434 and intermediate the arms 434 a rearwardly extending oppositely curved roll retaining arm 436. The roll supporting arms 434 are provided with upwardly turned ears 437 which prevent axial displacement of a supply of paper in the form of a roll. The roll supporting member just described is removably supported on the carriage 141 by means of downwardly extending projections 438 carried by the bar 433 to be received in retaining means now to be described.

It will be observed by reference to Fig. 17 that the guide plate 428 is provided at the top thereof with a horizontal flange 439 in which are formed slots 441 spaced apart a distance equal to the spacing of the projections 438 of the roll supporting bar 433. At the lower edge of the guide plate 428 and below each slot 441, two slits or cuts are made whereby tongues 442 are formed and these tongues are bent backwardly and upwardly to form pockets to receive and retain projections 438 on the bar 433. The paper roll holder may be easily removed from the carriage by lifting it vertically to withdraw the projections 438 from the pockets formed by the tongues 442 and from the slots 441.

Under some circumstances it may be desired to supply paper in the form of a web which is not supported on the carriage but which is stationarily mounted upon any suitable support behind the carriage. There is shown in Figs. 19 and 20 a guide member supportable in either of two positions and means on the carriage for supporting the guide member. As shown in Fig. 20, the carriage 141 has secured thereto and extending across the rear thereof a convexly formed plate 443 in which are formed spaced slots near the forward edge thereof and other similar slots near the rearmost edge thereof. A guide plate 444 which is adapted to be received by the convex plate 443 (Figs. 19 and 20) is provided at its opposite ends with flanges 446 between which there extends a paper retaining rod 447 in spaced relation to the plate 444. The plate 444 is provided at the foremost edge thereof with tongues 448 spaced apart a distance equal to the spacing of the slots in the convex plate 443, each tongue 448 having an offset 449. The plate 444 may be supported in an upwardly inclined position on the convex plate 443 by inserting the tongues 448 in the forward set of slots so that the foremost portions of the tongues abut the inner surface of the plate 443 with the offsets 449 disposed within the slots. This manner of mounting the guide plate 444 is disclosed in broken lines in the upper portion of Fig. 20. The plate 444 may also be supported in a downwardly inclined position by similarly inserting the tongues 448 in the rearmost slots in the convex plate 443. This mounting is shown in broken lines in the lower part of Fig. 20.

End-of-line indicator

An arrangement for indicating to the operator of the keyboard mechanism that the carriage is approaching its end-of-line position and should be returned to a position to print a new line by means of the carriage return and line feed functions is shown in Fig. 6. The arrangement comprises a bell 451 on the frame casting 37 adjacent to which is pivotally mounted a lever 452 which carries a bell striker 453. The lever 452 has a rearwardly extending arm 454 on which a flexible spring member 456 is mounted. The upper end of the spring 456 is disposed in the path of a projection 457 mounted on the carriage 141 so that when the carriage approaches its extreme left-hand position, the projection 457 will engage the spring member 456 and rotate the lever 452 to lift the bell striker 453. Continued movement of the carriage 141 causes the projection 457 to be carried to the left of the spring 456, whereby the bell striker 453 is permitted to descend into contact with the bell 451 to give an audible signal. The striker 453 is normally held just out of contact with the bell 451 by an adjustable stop comprising an eccentric 458 and a slight distortion of the lever 452 due to the inertia of the striker member 453 is relied upon to bring the striker into engagement with the bell 451, after which the elimination of the distortion due to the natural spring qualities of the lever 452 instantaneously withdraws the striker member from contact with the bell 451 and prevents the damping of the vibrations of the bell.

*Modified printing mechanism*

Figure 22:
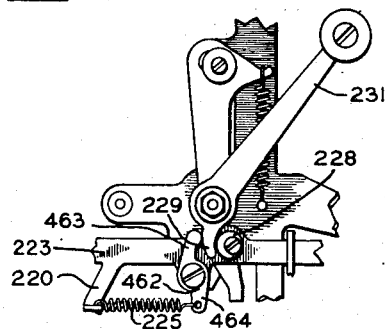
Fig. 22 is an elevational view of a modified print hammer operating mechanism.

In Fig. 22 there is shown a modified arrangement for operating the printing striker member 231. In this arrangement the arm 229 of the striker member 231, instead of being disposed behind the eccentric abutment 228 as in the previously described arrangement, is disposed ahead of it so that upon the operating stroke of the bar 223 the abutment 228 tends to move away from operating engagement with the striker member 231 and upon the return stroke, the abutment 228 operates against arm 229 to restore the striker member 231 to its unoperated position. The bar 223 is provided with lug 461 upon which is pivoted lever 462. The upper arm 463 of lever 462 abuts the foremost surface of striker lever 229 and the lower arm 464 of the lever 462 has connected to it the rearmost end of tension spring 225 which, in the previously described arrangement, was connected to the striker arm 229. The arm 229 of striker 231 is thus between the eccentric abutment 228 and the arm 463 of lever 462. The operation of this arrangement differs from that of the previously described arrangement in that the striker member 231 is operated by the combined action of the operating bar 223 and spring 225 and is restored by action of the abutment 228, whereas in the previously described arrangement the striker 231 is operated by the bar 223 through abutment 228 and is restored to unoperated position by the tension spring 225. The specific details of the operation of the arrangement shown in Fig. 22 are as follows: When the operating bar 223 is reciprocated to the right, the abutment 228 tends to move away from the arm 229 of striker 231 and the lever 462 tends to be rotated counterclockwise, increasing the tension of spring 225, both of these actions resulting from the inertia of the relatively heavy striker member 231, which tends to remain unmoved. When the inertia of that member is overcome, the striker 231 is operated very sharply, due to the energy stored in the spring 225. The striker 231 is positively brought to its idle or rest position upon the return movement of the bar 223.

*Electrical circuit*

Fig. 23 is a simplified schematic showing of the signalling circuit arrangement and the relationship thereto of the function lever operated contacts 351, 367, and 368. It was set forth in the description of the various function operations that the contacts 351 are assigned to the supervision of motor control mechanism, and that they are operated by function lever 361 and that the contacts 367 and 368 are assigned to a send-receive break operation whereby the transmitting mechanism may be disabled by remote control to provide for message reception, as when an operator during reception of a message, desires to interrupt the message and transmit a more important message or a request or inquiry. The contacts 367 and 368 are, as previously described, operated by the function lever 378. It will be noted by reference to Fig. 23, that the incoming telegraph line 466 is connected through a break key 467 to one side of all of the transmitting contacts 24 and to one of the contacts 368. As is well known in start-stop printing telegraph systems, one of the transmitting contacts is always closed when the transmitting mechanism is idle and one side of the selector magnet 67 is connected to the opposite side of the transmitting contacts 24 and the other side of the selector magnet 67 is connected to ground or other return. It will thus be observed that the selector magnet 67 receives signalling impulses from the line through one of the transmitting contacts 24 and that should these transmitting contacts be disturbed, as by depression of one of the key levers 18 (Fig. 1), the incoming signals will be interrupted. The normally open contacts 368 provide, when closed by operation of the lever 378, a direct shunt across the transmitting contacts 24, so that those contacts are rendered ineffective to transmit signals to the line and thus by operation of the function lever 378, the receiving mechanism may be placed in such condition that it cannot be disturbed by operation of the transmitting contacts. The normally closed button actuated key 467 is operative to open the line and thereby to impress on the line previously described an all-spacing or blank signal, by means of which the function lever 378 is selected and operated.

The contact pair 367 is provided for controlling the operation of a tape transmitter which it may be desirable to employ for transmitting signals to the line 466 instead of the keyboard transmitter 15 (Fig. 1). The manner in which the normally closed contacts 367 may, upon being opened, control a tape transmitter is clearly shown in U. S. Patent No. 1,904,164, granted April 18, 1933 to S. Morton et al. The manner in which the contacts 351 may supervise motor control mechanism is described in the hereinbefore mentioned Morgenstern patent.

*General operation*

A complete description of the cycle of operations involved in the printing of a character and also in the operation of a function will be described. Let it be assumed that a character is to be printed, following which a function, such as "shift," is to be performed.

As the signal impulses representing the character are applied to the selector magnet 67, the selector cam barrel 62 is released for operation in the manner described in the hereinbefore mentioned Walter J. Zenner patent, and the selector fingers 51 are successively positioned in accordance with the received impulses. About the time that the last of the impulses of the character code signal has been received, the clutch throw-out lever 212 is tripped by operation of the lever 214 by the cam 210 of cam barrel 62 and the clutch 211 becomes engaged, whereby rotation is imparted to the cams 216, 241, and 107. Almost immediately after the cams begin to rotate, the cam follower 218 (Fig. 9) is operated by the cam 216 to effect an operation in accordance with the position of the type wheel 101 as determined by the selection previously stored in the code disc selector 47. Immediately after the cam follower 218 has been restored to its idle position, the cam 107 operates its follower 106 (Fig. 11) which in turn operates the transfer bail 102, whereby the character code combination, in accordance with the setting of the selector fingers 51, is transferred through the levers 78 and transfer levers 81 (Fig. 6) to the code discs 91 of the code disc selector 47. The setting of these discs causes the particular stop pin 96 which had been selected previously to be cammed out of engagement with the type wheel stop arm 98 and as the code discs 91 assume their new positions, a new alignment of notches is established which permits a stop pin 96 corresponding to the new character code selection to move into the path of the type wheel stop arm 98. The withdrawal of the previously selected stop pin 96 from engagement with the type wheel stop arm 98 eliminates the restraint upon the stop arm, and type wheel shaft 44, which is under constant torque due to the friction clutch 46, is rotated until the arm 98 is stopped by the newly selected pin 96.

About the time that the transfer of the signal combination to the code discs 91 is effected, the next set of impulses is received by the selector magnet 67, which permits the cam barrel 62 to rotate and cooperate in the resetting of the selector fingers 51. These may now be reset because the combination representing the character which is to be printed has been transferred to the code discs. During the time that the cam barrel 62 is rotating to condition the selector mechanism in accordance with the second set of impulses and the type wheel is being rotated to its new position, the cam 241 is actuating its follower 243 (Fig. 10) to operate the spacing pawl 256, which rotates the spacing ratchet 262 to space the carriage for printing of the next character. When the clutch 211 has completed a single revolution, it is disengaged by its throwout lever 212 but is almost immediately permitted to be reengaged due to operation of the lever 214 as the cam barrel 62 approaches the end of a revolution after receiving the impulses for the next selection which, as previously mentioned, will be assumed to be a shift function. The cams 216, 241, and 107 thus begin a second revolution, and almost immediately the cam 216 operates its follower 218 (Fig. 9), whereby the bell crank lever 219 is rotated counterclockwise and the operating bar 223 is reciprocated rearwardly. The striker member 231 (Figs. 1, 2, and 3) is operated by the bar 223 and strikes the impact member 138 of the print hammer lever 117 a sharp blow. The print hammer operating lever 117 will be rocked counterclockwise (Fig. 1) and the print hammer 136 (Fig. 4) will strike the shank of the type pallet which has become aligned with it due to the stopping of the type wheel in a position corresponding to the character selection and the character will be printed on a page carried by the platen 139. Immediately after the character has been printed, the transfer cam 107 will operate in the manner previously described to transfer the shift function selection to the code discs, and the type wheel 101 will be rotated to a position corresponding to the shift function which is to be selected. It should be noted at this point that there is a stop position of the type wheel for every character to be printed or every function to be selected and that the printing of the character or the performance of the function can be effected only after the type wheel has come to rest in the particular position.

In order that the mechanism shall not come to rest with the shift function stored in the code discs, let it be assumed that another signal combination which may relate to any character or function is applied to the selector magnet 67, which will result in setting of the selector fingers 51. During the reception of this third signal combination, the spacing cam 241 will be operating to advance the carriage one character space. After the third signal combination has been received and the operating cams 216, 241, and 107 have completed a cycle of rotation, the clutch throwout lever 212 will be tripped and the cams will begin to rotate. The cam 216 will operate the striker member 231, as previously described, but since the code combination relates to a function, no character is to be printed, and therefore the print hammer 136 will be operated idly behind a dummy type pallet which has a short shank and which carries no character on the face thereof. Simultaneously with the operation of the operating bar 223, the lever cams 226 (Fig. 9) will be operated and the function selecting lever 305 (Fig. 12) will be rocked and will engage an index pin 271 which has been positioned as a result of the stopping of the type wheel in shift selection position to form a fulcrum for the lever 305. The lever 305, upon being operated, will rock the lever 302 counterclockwise and will latch the function operating bar 280 behind the latching projection 304 carried by its associated latching lever 306. The latching of function performing bar 280 behind latching projection 304 is due not only to shifting of the bar by lever 302, but also to simultaneous rearward reciprocation of the bar by the operation of cam 241 upon its cam follower 243. As the function bar 280 continues to be moved rearwardly, its operating projection 307 (Fig. 6) will engage the shift lever 308 and will shift the type wheel shifter frame 314 to raise the type wheel to its uppermost position.

Since, as previously stated, it is desirable that the platen carriage 141 shall not be spaced when a function is performed, the space suppression function lever 394 will be operated, due to engagement of lever 395 with an index pin 271, simultaneously with the shift function lever 302 to withdraw the spacing pawl 256 from engagement with the spacing ratchet 262, and the pawl will reciprocate idly against the arm 404 of bell crank lever 406. At the conclusion of the shifting and space suppression operations, the cams 216, 241, and 107 will come to rest due to disengagement of the clutch 211 by clutch throw-out lever 212 and if no further signal combinations are applied to the selector magnet 67, the selector cam barrel 62 will come to rest with the last received code combination stored in the code disc selector 47.

The universal adaptability of the herein described receiving and printing mechanism to particular operating requirements and conditions is an outstanding characteristic of this invention. Characters to be printed may be identified with any code combinations as desired, merely by arranging the type pallets accordingly within the type wheel. Functions may be identified with any code combinations as desired, and a plurality of functions may be identified with a single code combination, or a single function may be identified with a plurality of code combinations, merely by providing index pins in particular horizontal and vertical planes. From this it is apparent that receiving and printing units in accordance with a single standard of manufacture may be suited to different individual requirements by providing different arrangements of pallets within the type wheel and different arrangements of function index pins. It will also be apparent that a unit already conforming to a particular requirement may be readily converted to conform to a different requirement by changing the arrangement of type pallets within the type wheel, and the arrangement of function index pins. Such conversion of a typing unit is facilitated by having the type wheel at the top of the type wheel shaft, and readily removable therefrom, the set of index pins at the bottom of the type wheel shaft and also readily removable therefrom, and by having the sole rotational mounting of the type wheel shaft between the type wheel and the index pins, so that both ends of the shaft and the elements mounted thereat are readily accessible.

Although a particular embodiment of the invention has been described herein, it will be understood that the apparatus is capable of many modifications and substitutions in the various elements and combinations thereof within the scope of the appended claims.

What is claimed is:

1. In a printing telegraph apparatus, a carriage movable for character spacing, a ratchet operable to move said carriage, a reciprocable pawl for operating said ratchet, means operable under predetermined conditions for rocking said pawl away from said ratchet, and yieldable means normally in the path of said pawl for holding said pawl away from said ratchet during reciprocation following the rocking thereof.

2. In a printing telegraph apparatus, a carriage movable for character spacing, a ratchet operable to move said carriage, a reciprocable pawl for operating said ratchet, means selectively positionable for character and function selections, means operable in response to a function selection for withdrawing said pawl from operative relation to said ratchet, and yieldable means normally in the path of the pawl for holding said pawl withdrawn during reciprocation.

3. In a printing telegraph apparatus, a carriage movable for character spacing, a rack carried by said carriage, a pinion meshing with said rack, a ratchet connected to said pinion, a reciprocable pawl for operating said ratchet, means selectively positionable for character and function selections, means operable in response to function selections for withdrawing said pawl from operative relation to said ratchet, and yieldable means normally in the path of said pawl for holding said pawl withdrawn during reciprocation thereof.

4. In a printing apparatus, a carriage movable for character spacing, a ratchet operable to move said carriage, a reciprocable pawl for operating said ratchet, an instrumentality for rocking said pawl, a lever subject to two varieties of rotation articulated to said instrumentality, indexing means comprising a fulcrum movable into selective engagement with said lever, cam operated means cooperable with said fulcrum in response to a function selection for effecting, through said instrumentality, the withdrawal of said pawl from operative relation with said ratchet, and yieldable means normally in the path of the pawl for holding said pawl withdrawn during reciprocation.

5. In a printing apparatus, a carriage movable for character spacing, a ratchet operable to move said carriage, a reciprocable pawl for operating said ratchet, cam operated means, a lever pivotally mounted on said means and arranged for rotation with the operation of said cam means, indexing means movable selectively to a position to establish a fulcrum for said lever whereby when said cam operated means is actuated said lever will be rotated about said indexing means as a fulcrum, pawl rocking means articulated to said lever and moved when said lever is rotated about said indexing means as a fulcrum for moving said pawl free of said ratchet, and yieldable means normally in the path of said pawl for holding said pawl away from said ratchet during reciprocation following the movement of said pawl free of said ratchet.

6. In a printing apparatus, a carriage movable for character spacing, a rack carried by said carriage, a pinion meshing with said rack, a ratchet connected to said pinion, a reciprocable pawl for operating said ratchet, an instrumentality for rocking said pawl, a lever subject to two varieties of rotation articulated to said instrumentality, abutment means selectively indexed for function selections, means cooperable with said abutment means in response to function selections for effecting, through said instrumentality, the rocking of said pawl from operative relation with said ratchet, and yieldable means normally in the path of said pawl for holding said pawl from operative relation during reciprocation thereof.

ALBERT H. REIBER.